United States Patent [19]

Bassett et al.

[11] Patent Number: 5,374,013

[45] Date of Patent: Dec. 20, 1994

[54] METHOD AND APPARATUS FOR REDUCING DRAG ON A MOVING BODY

[76] Inventors: David A. Bassett, 1708 Corwin Dr., Silver Spring, Md. 20910; Marlin R. Bassett, 2665 Fisher Rd., Warsaw, N.Y. 14569; John C. Schroeder, 2287 Shawnee Trail, Okemos, Mich. 48864-2527

[21] Appl. No.: 145,659

[22] Filed: Nov. 4, 1993

Related U.S. Application Data

[63] Continuation of Ser. No. 712,046, Jun. 7, 1991, abandoned.

[51] Int. Cl.$^5$ ............... B64C 23/06; B61D 17/02; B62D 37/02; G01F 1/44
[52] U.S. Cl. ............... 244/130; 244/199; 105/1.3; 296/180.1; 73/861.64
[58] Field of Search ............... 244/130, 198, 199; 105/1.1, 1.3; 296/91, 180.1; 180/DIG. 903; 73/861.63, 861.64

[56] References Cited

U.S. PATENT DOCUMENTS

| | | | |
|---|---|---|---|
| 1,435,490 | 11/1922 | Mitchell . | |
| 2,037,942 | 4/1936 | Stalker | 244/130 |
| 2,136,403 | 11/1938 | Vance et al. | 244/198 |
| 2,240,119 | 4/1941 | Montgomery et al. | 73/861.63 |
| 2,361,924 | 11/1944 | Boynton . | |
| 2,514,695 | 7/1950 | Dempsey . | |
| 3,374,971 | 3/1968 | Heskestad | 244/130 |
| 3,437,371 | 4/1969 | Gallie . | |
| 3,578,264 | 5/1971 | Kuethe . | |
| 3,588,005 | 6/1971 | Rethorst . | |
| 3,672,718 | 6/1972 | Broyer . | |
| 3,776,363 | 12/1973 | Kuethe . | |
| 3,836,191 | 9/1974 | Gotz . | |
| 4,174,083 | 11/1979 | Mohn | 244/199 |
| 4,268,892 | 5/1981 | Pfeiffer et al. . | |
| 4,323,209 | 4/1982 | Thompson | 244/199 |
| 4,343,506 | 8/1982 | Saltzman . | |
| 4,418,880 | 12/1983 | de Waal | 244/199 |
| 4,455,045 | 6/1984 | Wheeler . | |
| 4,460,055 | 7/1984 | Steiner | 296/180.1 |
| 4,571,192 | 2/1986 | Gongwer | 244/199 |
| 4,671,474 | 6/1987 | Haslund | 244/199 |
| 4,706,910 | 11/1987 | Walsh et al. | 244/199 |
| 4,789,117 | 12/1988 | Paterson . | |
| 4,810,022 | 5/1989 | Takagi et al. | 180/903 |
| 4,813,635 | 3/1989 | Paterson et al. | 244/199 |
| 4,830,315 | 5/1989 | Presz, Jr. et al. | 244/199 |
| 5,069,403 | 12/1991 | Marentic | 244/130 |
| 5,074,234 | 12/1991 | Stearns, IV | 244/199 |
| 5,186,413 | 2/1993 | Deakin | 244/3.28 |

FOREIGN PATENT DOCUMENTS

| | | | |
|---|---|---|---|
| 0152618 | 9/1983 | Japan | 296/180.1 |
| 0000577 | 5/1989 | Japan | 296/180.1 |
| 0443903 | 3/1936 | United Kingdom | 296/180.1 |
| 1530913 | 1/1987 | U.S.S.R. | 73/861.63 |

OTHER PUBLICATIONS

Schapiro, "Shape and Flow-The Fluid Dynamics of Drag", MIT, Anchor Books, Doubleday & Co., NYC, c. 1961.

(List continued on next page.)

Primary Examiner—Michael S. Huppert
Assistant Examiner—Virna Lissi Ansley
Attorney, Agent, or Firm—Howrey & Simon

[57] ABSTRACT

A method of and apparatus for reducing drag produced by relative air movement on a moving body are disclosed. The method includes the steps of modifying a rear air pressure behind a rear of the body such that the rear air pressure is increased, wherein the air pressure modifying step includes inletting an amount of air from a boundary flow around the body and forming a pressure shell behind the rear of the body, wherein the pressure shell forming step includes forming a large vortex behind the rear of the body by outletting the inlet air at the rear of the body in a plurality of small high-energy vortices.

48 Claims, 14 Drawing Sheets

OTHER PUBLICATIONS

Buckley et akm "An Assessment of Drag Reduction Techniques Based on Observations of Flow Past Two-Dimensional Tractor-Trailer Models", Univ. of Maryland, College Park, Md., Oct. 1974.

Buckley et al., "A Study of Aerodynamic Methods for Improving Truck Fuel Economy", Univ. of Maryland, College Park, Md. for NSF/RANN, Dec. 1978.

Jacobs et al., "Ducted Trailers for Semi-Trucks (Overcoming Aerodynamic Drag by Wake Energization)", Univ. of Utah, Salt Lake City, Utah, as reported in Proceedings of the NSF/DOT Conference on Reduction of the Aerodynamic Drag of Trucks, Cal. Tech., Pasadena, Calif., Oct. 1974.

Foa, "Elements of Flight Propulsion", John Wiley & Sons, New York, 1960.

Hohenemser, "Preliminary Analysis of a New Type of Thrust Augmenter":, Proceedings of 4th U.S. National Congress of Applied Mechanics, (ASME, N.Y., 1962).

Foa, Unsteady Propeller Forces, "The Bladeless Propeller", Proceedings of 7th Symposium on Naval Hydrodynamics, Office of Naval Research & Marina Militare Italiana, Rome, Italy, 1968.

Muirhead, "An Investigation of Drag Reduction on Box-shaped Vehicle With Various Modifications-Final Report", NASA fiche #N81-29097, Kansas Univ. Center for Research, Aug. 1981.

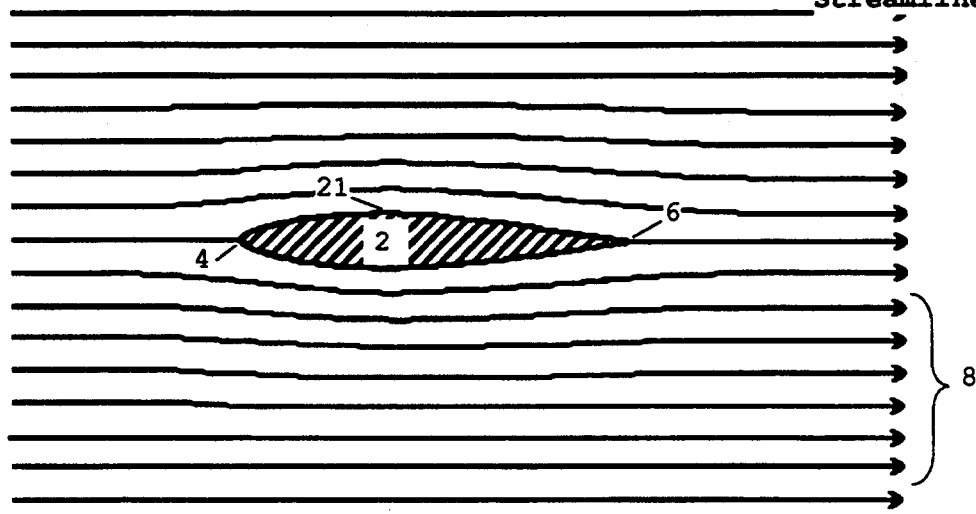
Fig. 1(a) Streamlines
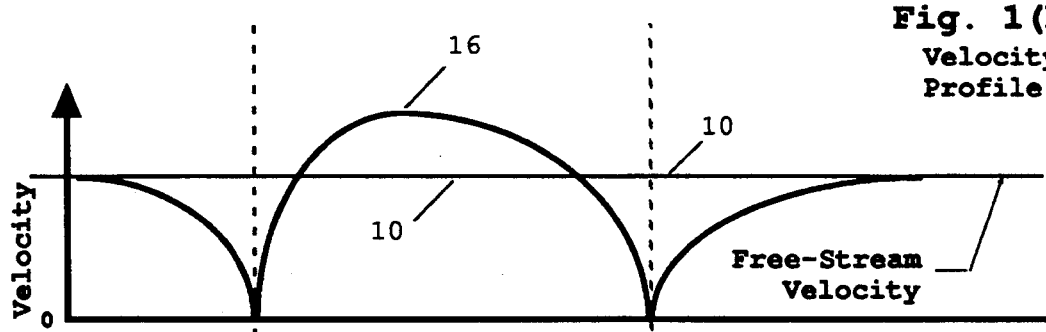
Fig. 1(b) Velocity Profile
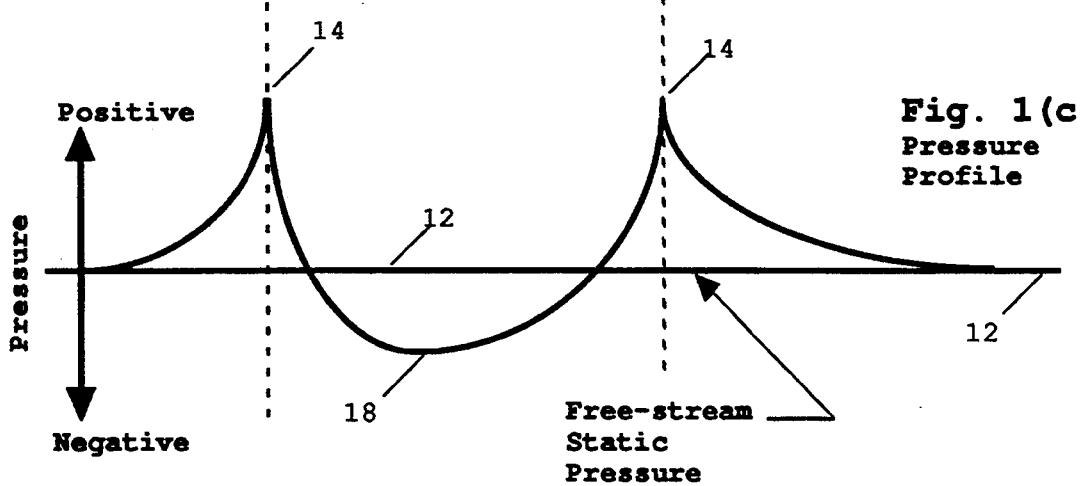
Fig. 1(c) Pressure Profile Streamlines Velocity Profile Pressure Profile

Relative Winds

ß = 0

ß = 90

0 < ß < 90

90 < ß < 180

Streamlines

Velocity Profile

——— Upstream
··········· Downstream

Pressure Profile

Separation Angle (ß) between the Ambient Wind and the Longitudinal Axis of Bluff Body (degrees)

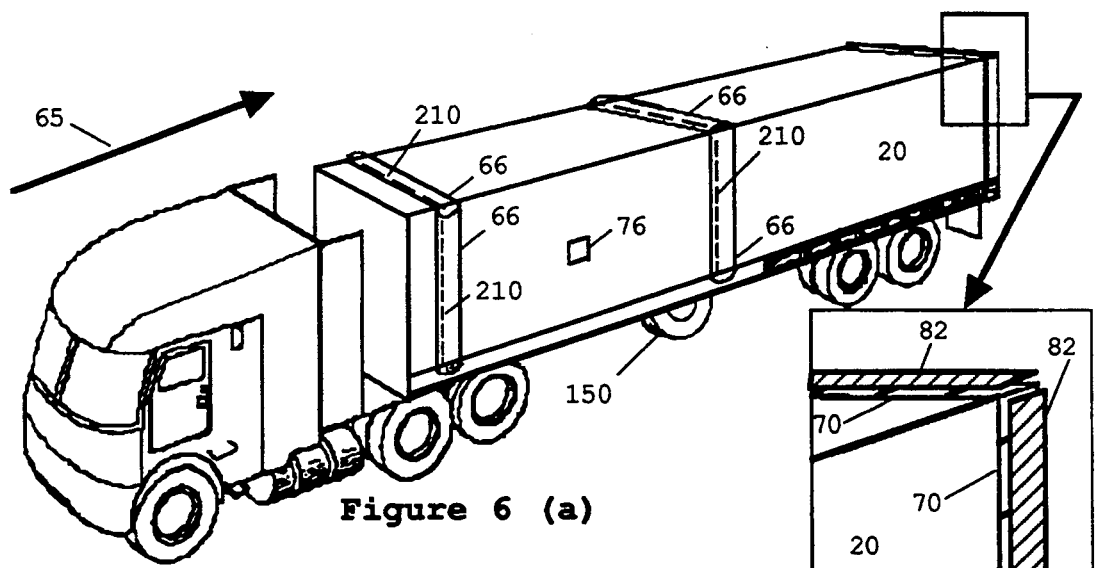
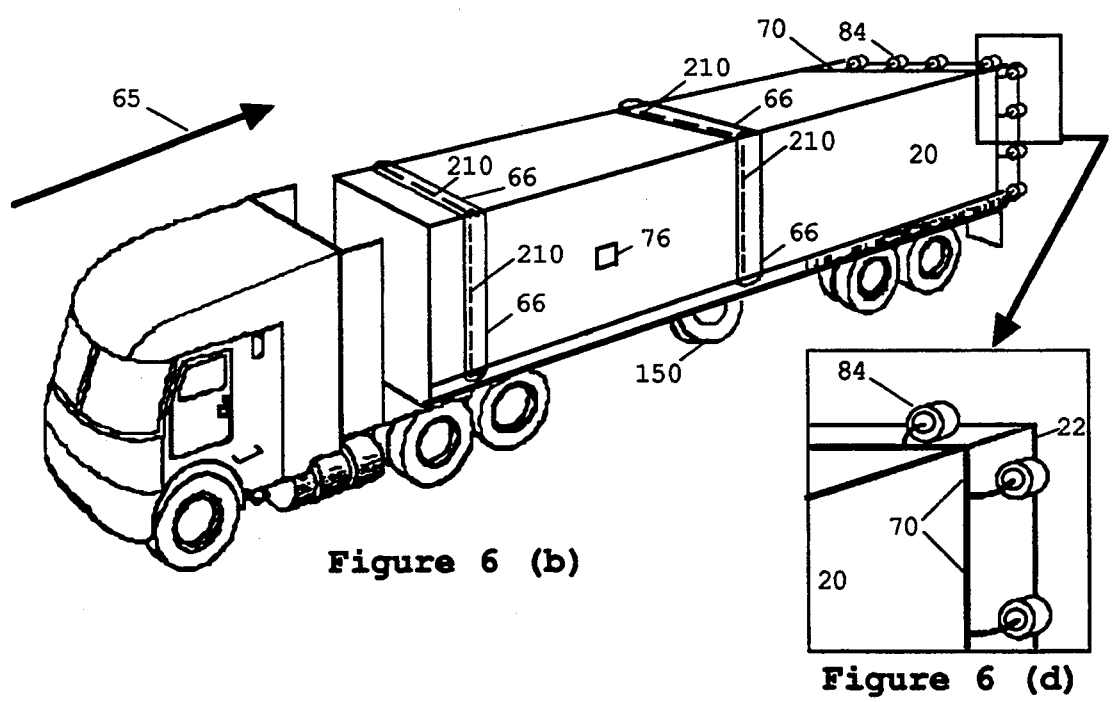

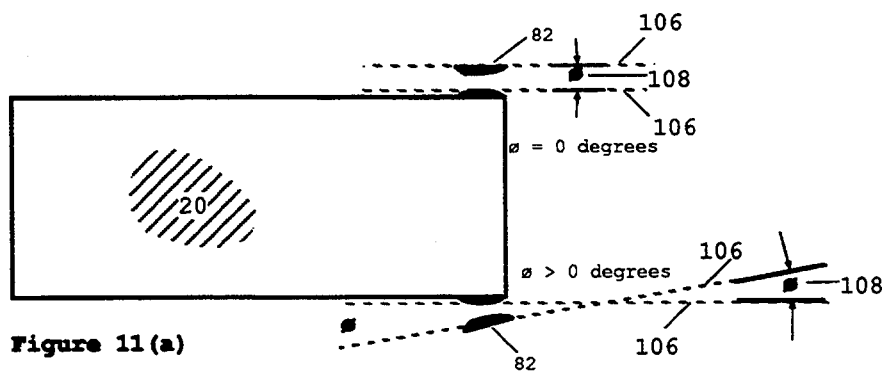
Figure 11(a)
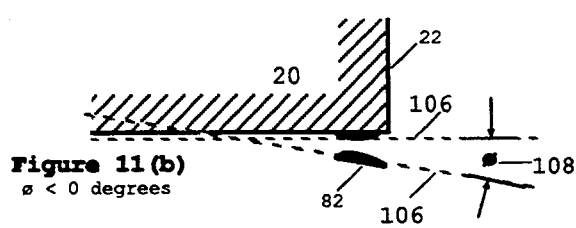
Figure 11(b)
ø < 0 degrees
| ø = 0 degrees | ø ≥ 0 degrees | ø ≤ 0 degrees | Offsets |
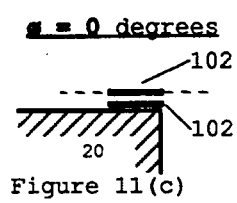 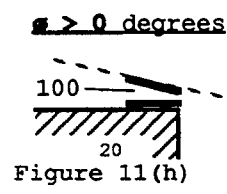 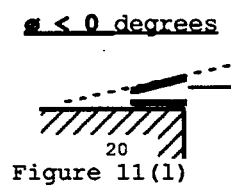 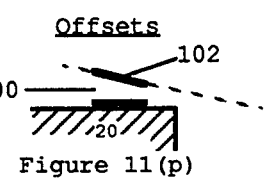
Figure 11(c)    Figure 11(h)    Figure 11(l)    Figure 11(p)
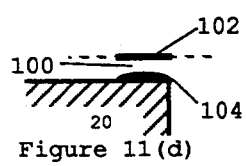 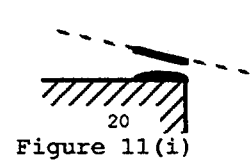 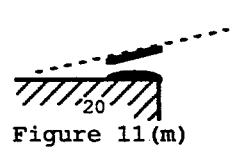 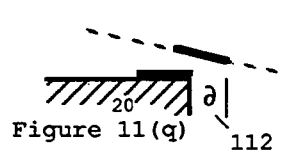
Figure 11(d)    Figure 11(i)    Figure 11(m)    Figure 11(q)
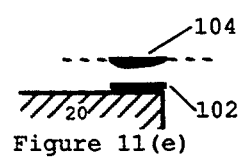 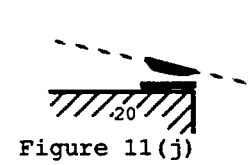 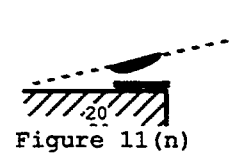 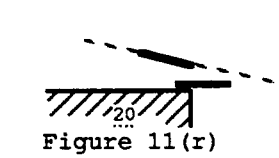
Figure 11(e)    Figure 11(j)    Figure 11(n)    Figure 11(r)
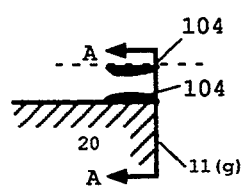 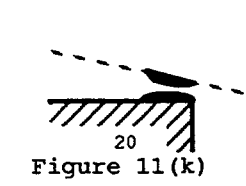 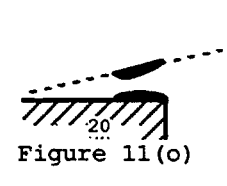 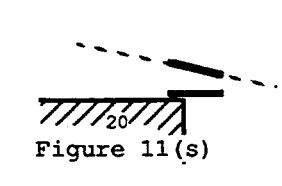
Figure 11(f)    Figure 11(k)    Figure 11(o)    Figure 11(s)
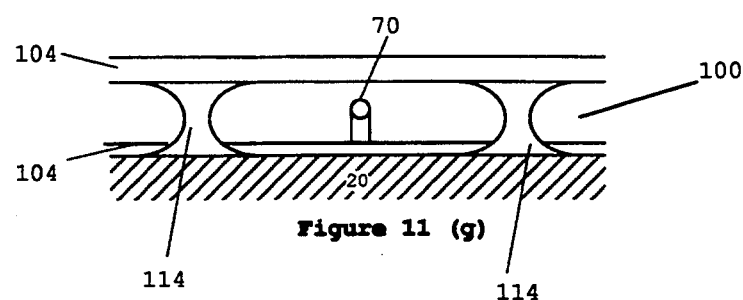
Figure 11 (g)

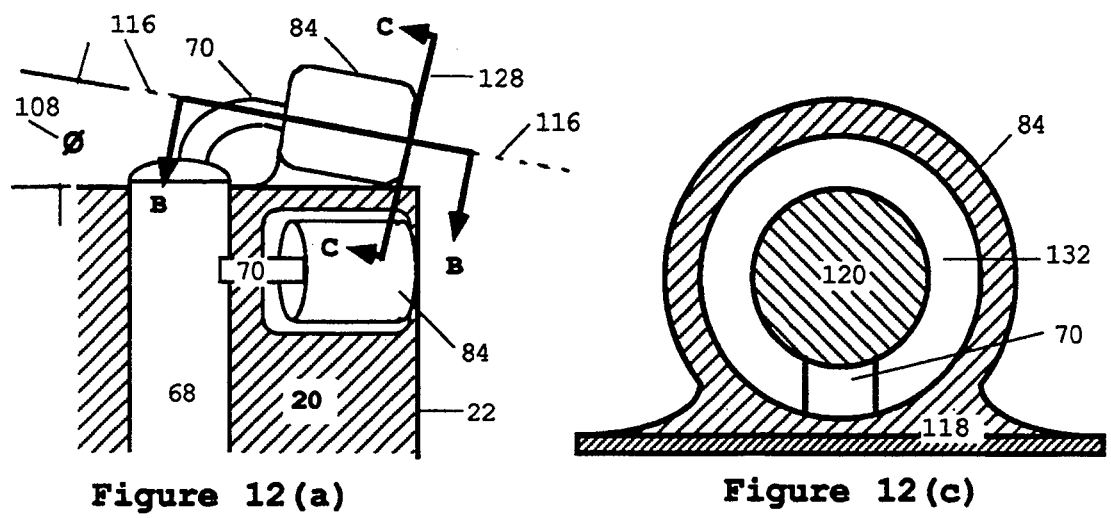
Figure 12(a)
Figure 12(c)
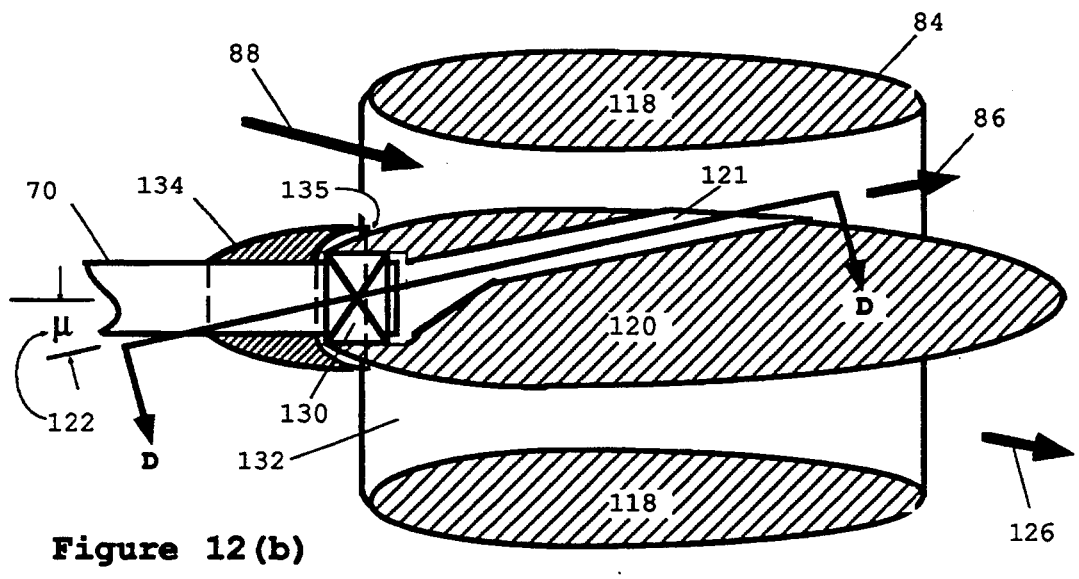
Figure 12(b)
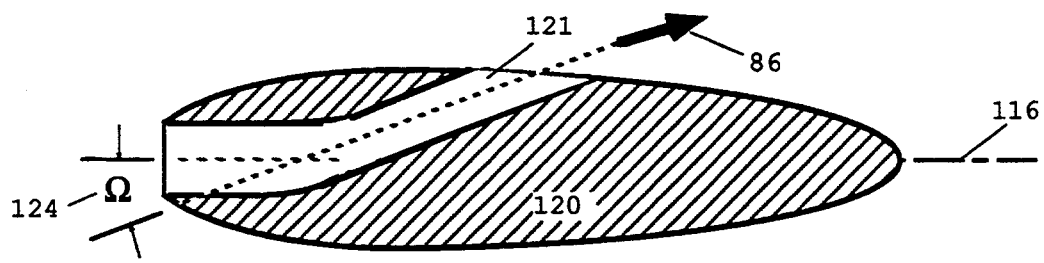
Figure 12(d)

METHOD AND APPARATUS FOR REDUCING DRAG ON A MOVING BODY

This is a continuation of application Ser. No. 07/712,046, filed Jun. 7, 1991, now abandoned.

BACKGROUND OF THE INVENTION

1. Field of the Invention

The present invention relates to methods and apparatuses for reducing drag, and more particularly to methods and apparatuses for reducing drag produced by relative air movement on a moving body.

2. Description of Prior Art

Numerous means have been sought to improve the fuel-efficiency of moving bodies, and especially moving bluff bodies, by reducing their aerodynamic drag. In the field of surface transportation, and particularly in the long-haul trucking industry, even small improvements in fuel efficiency can reduce annual operating costs significantly. Previous investigations of aerodynamic drag of tractor-trailer trucks resulted in widespread adoption of air deflectors mounted on tractor cabs, and wholly redesigned tractors that utilize aerodynamic fairings to gradually increase the relatively small frontal area of tractors to match, and to blend smoothly with, the larger cross-section of typical trailers. Current air deflectors and fairings help guide the slipstream around the front of tractor-trailer trucks, and thereby reduce aerodynamic drag and improve fuel efficiency.

However, bluff bodies include generally flat rear ends, and the flat rear end of bluff bodies such as trailers is known to contribute significantly to aerodynamic drag. Current bluff bodies suffer from a severe pressure gradient from their widest point to their rear, such that a boundary layer therearound becomes stalled very rapidly, near the widest point. A stalled boundary layer causes flow to separate and a broad eddying wake to form downstream of the separation. The net result is the creation of considerable aerodynamic drag.

Previous attempts to streamline moving bodies such as bluff bodies have been constrained by legal and practical considerations. Federal and state regulations restrict the size of highway transport vehicles and inhibit conventional methods of streamlining because they limit the length and width of "add-on" aerodynamic devices. Current legal restrictions exclude devices that improve energy efficiency even if they result in only minor changes in overall dimension. Conventional streamlined afterbodies or "boat-tails" attached to the rear of trailers suffer the disadvantages of significantly increasing physical dimensions of the trailer and of interfering with loading and unloading. Additionally, when not in use, large retrofit "boat-tail" devices require additional space either for storage or for trailer parking, and further, limit the number of trailers that can be loaded onto flat-bed rail cars. Given the choice, trailer manufacturers currently prefer to design for maximum cargo capacity instead of minimum aerodynamic drag.

Therefore, a practical device is needed to reduce aerodynamic drag, particularly base pressure drag, from bluff bodies like tractor-trailer trucks. Such a device or apparatus needs to be in compliance with existing regulations, i.e., it needs to be within the scope of exclusionary clauses that permit only minor changes in the overall dimensions of tractor-trailer trucks. Further, the device or apparatus needs to reduce drag without interfering with cargo capacity, without altering current methods of loading and unloading, without requiring additional parking or storage space, and without changing current shipping practice.

Therefore, the present invention provides a method and apparatus for reducing the drag produced by relative air movement on a moving body, and especially a moving square-bodied bluff body. The present invention provides a method and apparatus for improving the fuel efficiency of a moving body, without significantly altering overall physical dimensions, without reducing cargo capacity, without significantly interfering with loading and unloading, without requiring substantially greater parking space, and without altering current shipping practices.

SUMMARY OF THE INVENTION

To overcome the problems of the prior art, the present invention provides a method of reducing drag produced by relative air movement on a moving body, which includes the steps of modifying a rear air pressure behind a rear of the body such that the rear air pressure is generally near a frontal air pressure produced on a front of the body by the relative air movement, wherein the air pressure modifying step includes inletting an amount of air from a boundary flow around the body, and forming a pressure shell behind the rear of the body, wherein the pressure shell forming step includes forming a large vortex behind the rear of the body by outletting the inlet air at the rear of the body in a plurality of small high-energy vortices.

The present invention also provides an apparatus for reducing drag on a moving body, which includes a controller, at least one sensor for sensing a pressure and yaw angle of a relative air movement, wherein an output of the sensor is connected to the controller, at least one air inlet for inletting air, a plurality of thrust augmenters connected to the air inlet, and at least one valve connected between the air inlet and the plurality of thrust augmenters, wherein the controller is connected to the valve to control a rate of air flow through the valve in response to the output of the sensor.

The present invention further provides an apparatus for reducing drag on a moving body, which includes inletting means for inletting an amount of air from a boundary flow, and pressure shell forming means for forming a pressure shell, wherein the pressure shell forming means includes small vortex forming means for forming a plurality a small high-energy vortices which form a large vortex, the small vortex forming means including outletting means for outletting the inlet air, and entraining means for entraining a portion of the boundary flow with the inlet air.

The present invention also provides an apparatus for reducing drag on a moving body, which includes at least one inlet mounted on a forward portion of body, a plurality of thrust augmenters mounted on a rear portion of the body, at least one duct mounted on the body and connecting the inlet with the thrust augmenters, at least one valve in the duct, a pair of sensors mounted on the body to sense a pressure and a yaw angle of a relative air movement on the body, and a controller connected to the sensors and the valve to control the valve and thus an air flow rate through the thrust augmenters, based on outputs of the sensors.

BRIEF DESCRIPTION OF THE DRAWINGS

FIG. 1(a) is a schematic view of fluid flow around a streamlined body;

FIGS. 1(b)–(c) are velocity and pressure profiles, respectively, of a fluid particle intercepting the streamlined body of FIG. 1(a) at a center of its longitudinal axis;

FIG. 6(a) is a perspective view of a first embodiment of the apparatus of the present invention fitted onto a conventional bluff body;

FIG. 6(b) is a perspective view of a second embodiment of the apparatus of the present invention fitted onto a conventional bluff body;

FIG. 6(c) is a detail view of a portion of FIG. 6(a);

FIG. 6(d) is a detail view of a portion of FIG. 6(b);

FIG. 7(a) is a rear view of the apparatus and the bluff body of FIG. 6 (a);

FIG. 7(b) is a rear view of the apparatus and the bluff body of FIG. 6 (b);

FIG. 7(c) is a detail view of a portion of FIG. 7(a);

FIGS. 11(a)–(f) and 11(h)–(s) are schematic views of flow directors of the apparatus of FIG. 6(a);

FIG. 11(g) is a cross-sectional view along line A—A in FIG. 11(f);

FIG. 12(a) is a view similar to FIG. 8(d);

FIG. 12(b) is a cross-sectional view along line B—B in FIG. 12(a);

FIG. 12(c) is a cross-sectional view along line C—C in FIG. 12(a);

FIG. 12(d) is a cross-sectional view along line D—D in FIG. 12(b);

FIG. 13(a) is a view similar to FIG. 7(a), showing the formation of a plurality of small vortices, and a large vortex;

FIG. 13(c) is a view similar to FIG. 8(a), showing the creation of a "pressure shell" in the wake of the bluff body;

FIG. 13(d) is a schematic view of fluid flow around a bluff body on which the apparatus of the present invention is mounted;

DETAILED DESCRIPTION

Figure 2:
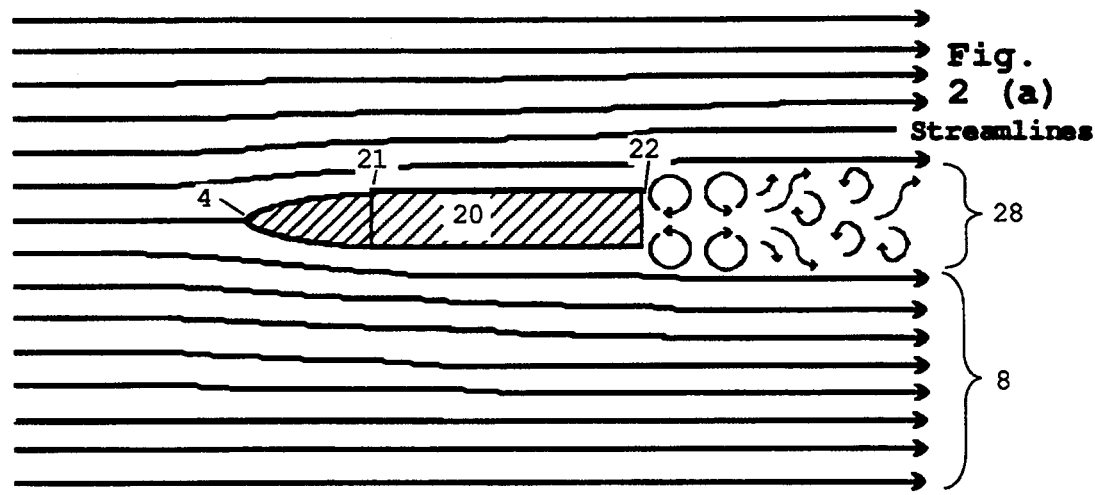
FIG. 2(a) is a schematic view of fluid flow around a conventional bluff body.
FIGS. 2(b)–(c) are velocity and pressure profiles, respectively, of a fluid particle intercepting the bluff body of FIG. 2(a) at a center of its longitudinal axis.
Figure 2:
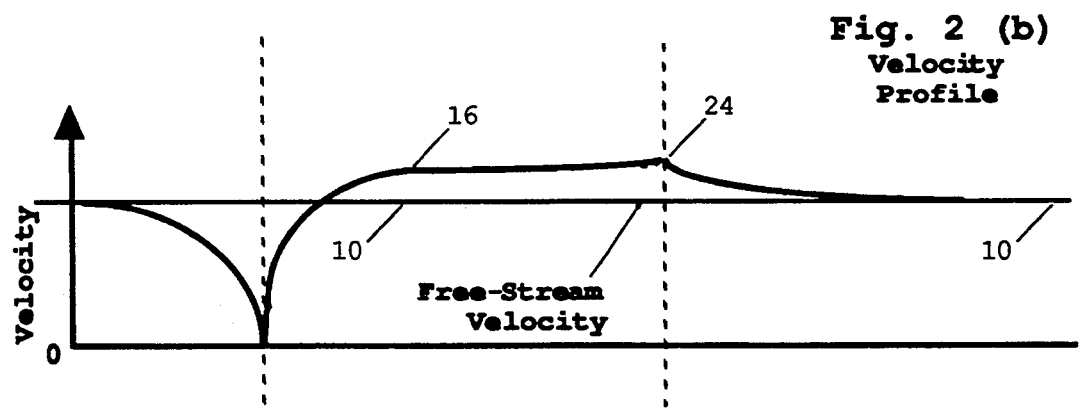
Figure 2:
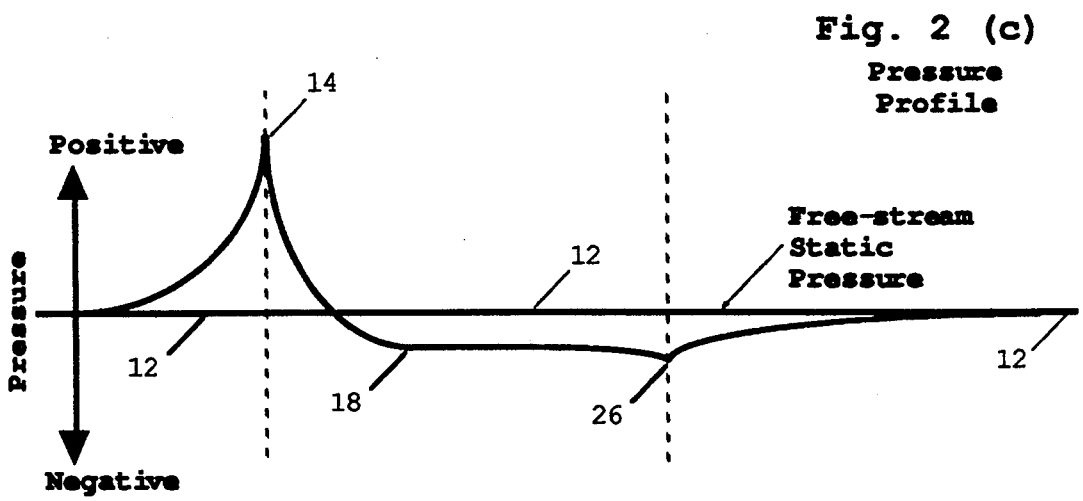

FIG. 1(a) illustrates a streamlined body (2) such as a symmetric airfoil with a leading edge (4) and a trailing edge (6). Streamlines (8) provide visualization of the fluid flow around streamlined body (2). Referring to FIGS. 1(b) and 1(c), a fluid particle intercepting streamlined body (2) at its longitudinal center and leading edge (4) experiences a deceleration from free-stream velocity (10) to zero at leading edge (4) of streamlined body (2). Concurrently, the dynamic pressure increases from free-stream static pressure (12) and reaches a maximum "stagnation pressure" (14). As the fluid particle continues to move downstream, it accelerates to above free-stream velocity and reaches a maximum speed (16) near the widest point (21) of streamlined body (2) with an associated minimum pressure (18) that is less than free-stream static pressure (12).

In an ideal streamlined body (2), as the fluid particle continues downstream, it decelerates to zero velocity at the trailing edge (6), where pressure once again reaches a maximum "stagnation pressure" (14). As the fluid particle recovers from the passage of streamlined body (2), it accelerates and reaches equilibrium with the free-stream velocity (10). Simultaneously, the pressure decays from "stagnation pressure" (14) and again reaches equilibrium with free-stream static pressure (12).

FIG. 2(a) illustrates a bluff body (20) with a maximum width at (21), and with a bluff trailing edge (22). Flow streamlines (8) are shown around the bluff body (20). Due to the bluff trailing edge (22), the velocity of a fluid particle in the stream does not reach zero at the trailing edge (22), as indicated by the base velocity (24) in FIG. 2(b), and the pressure recovery is incomplete, as indicated by the base pressure (26) in FIG. 2(c). A comparison of FIGS. 1(b) and 2(b), and of FIGS. 1(c) and 2(c) illustrates the difference between the velocity and pressure profiles created by the streamlined body (2) and the bluff body (20). In the bluff body (20), a difference between the stagnation pressure (14) at the leading edge (4) of the bluff body (20) and the base pressure (26) at the bluff trailing edge (22) gives rise to a retarding force, i.e., base pressure drag. Flow in the wake of the bluff body (20) is chaotic and is indicated as a turbulent wake (28) in FIG. 2(a).

Figure 3:
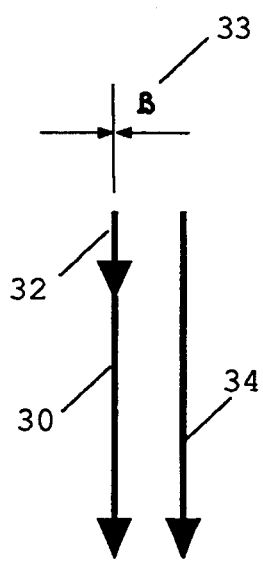
FIGS. 3(a)–(d) are vector representations of relative winds resulting from the combined effects of various ambient winds and various apparent winds developed by the forward motion of a moving body.
Figure 3:
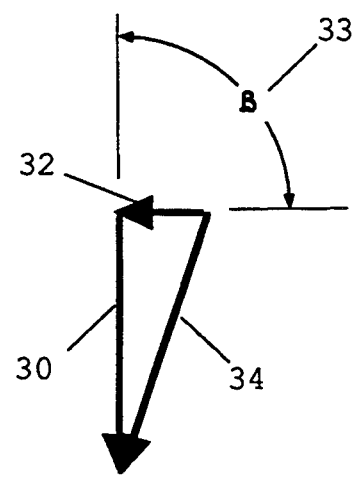
Figure 3:
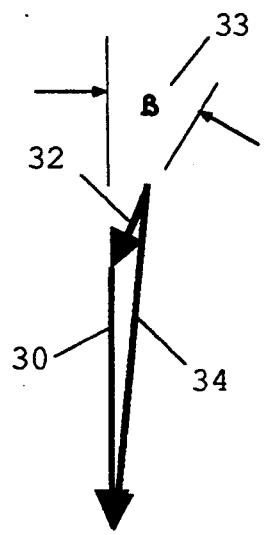
Figure 3:
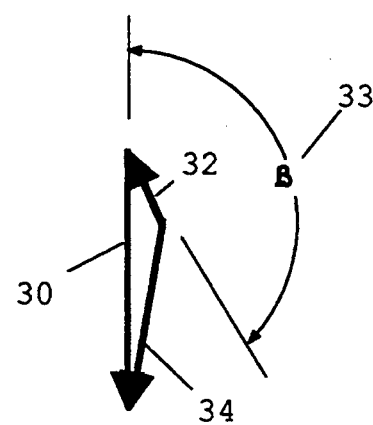

FIGS. 3(a)–(d) illustrate the variable nature of winds to which both streamlined and bluff bodies are subjected. As either the streamlined body (2) or the bluff body (20) moves through a stationary fluid, its forward motion creates an apparent wind (30) from the point of reference of the moving body. A vector representing apparent wind (30) is equal in magnitude to the forward velocity of the moving body and exactly opposite in direction. In the case where the moving body encounters an ambient wind (32) at a separation angle S (33), the resulting relative wind (34) is a vector sum of the apparent wind (30) and the ambient wind (32). FIG. 3(a) illustrates a relative wind (34) created when an ambient wind (32) is a headwind and the separation angle β (33) equals zero. FIG. 3(b) illustrates a relative wind (34) when an ambient wind (32) is a crosswind and the separation angle β (33) equals 90 degrees. FIG. 3(c) illustrates a relative wind (34) when an ambient wind (32) is quartering, between a headwind and crosswind, and the separation angle β (33) is between zero and 90 degrees. FIG. 3(d) illustrates a relative wind (34) when an ambient wind (32) is a partial tailwind, and the separation angle β (33) is between 90 and 180 degrees.

FIG. 4(a) illustrates a bluff body (20) such as a conventional tractor-trailer truck with a bluff trailing edge (22), and with flow streamlines (8) therearound resulting from a relative wind (34). In FIG. 4(a), a relative wind (34) is skewed from the longitudinal axis (36) of the bluff body (20) by a yaw angle Δ (40). The velocity profile of FIG. 4(b) and the pressure profile of FIG. 4(c) indicate different behaviors in the flows near the upstream and downstream surfaces of the bluff body (20), of fluid particles which intercept the bluff body (20) at a point (17) of maximum stagnation pressure. The point (17) of maximum stagnation pressure is shifted from the leading edge (4) in FIG. 4(a) due to the yaw angle Δ (40) at which the relative wind (34) acts.

Figure 4:
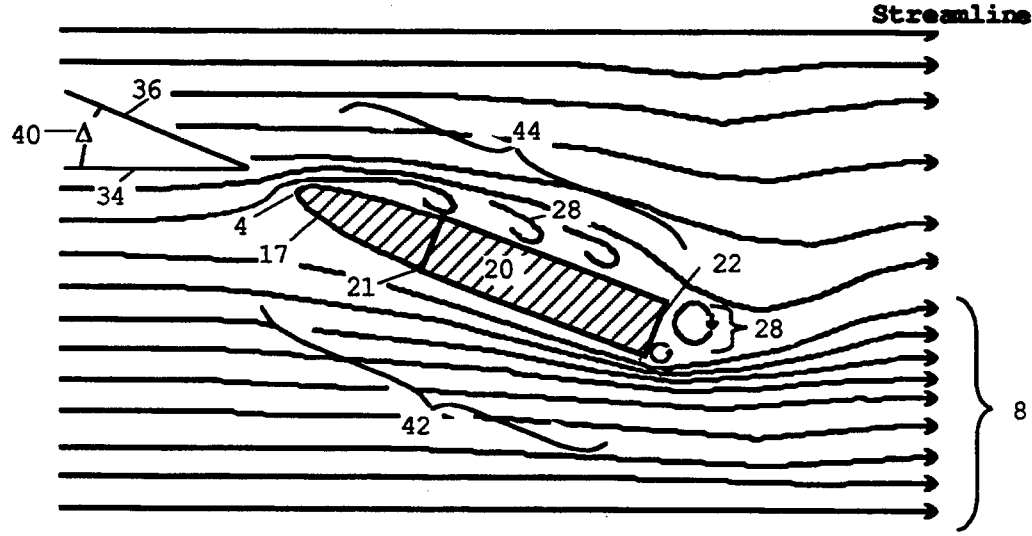
FIG. 4(a) is a schematic view of fluid flow around a conventional bluff body resulting from a relative wind acting in a direction which is skewed from the longitudinal axis of the bluff body by a yaw angle.
FIGS. 4(b)–(c) are velocity and pressure profiles, respectively, of fluid particles intercepting the bluff body of FIG. 4 (a)
Figure 4B:
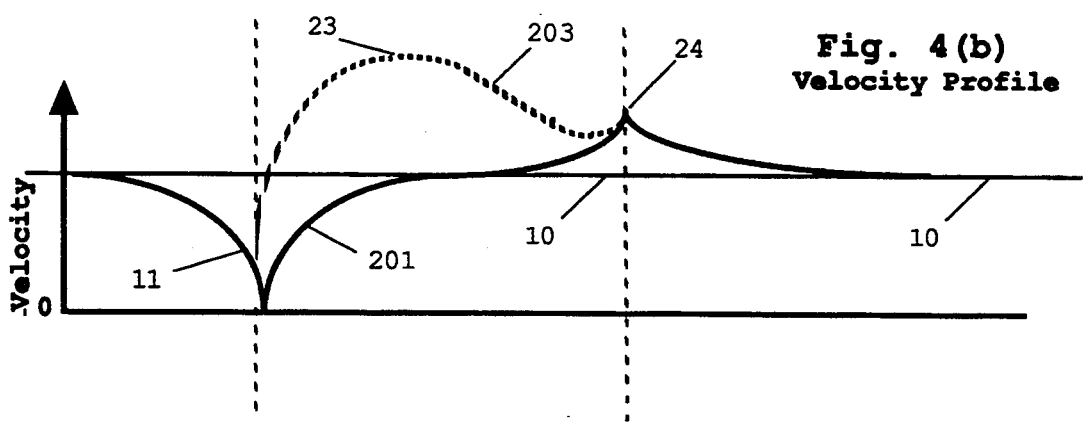

On the upstream side (42) of the bluff body (20), the velocity profile of FIG. 4(b) shows that a fluid particle first decelerates from a free-stream velocity (10) towards zero where reaches an intermediate off-axis nose velocity (11) at the leading edge (4) and where it eventually reaches zero velocity at the point (17) on the bluff body (20). The fluid particle then accelerates gradually, as shown by the curve (201), from zero velocity at the point (17) to a maximum base velocity (24) near the trailing edge (22), and then gradually decelerates once again until it reaches equilibrium with the free-stream velocity (10).

Figure 4C:
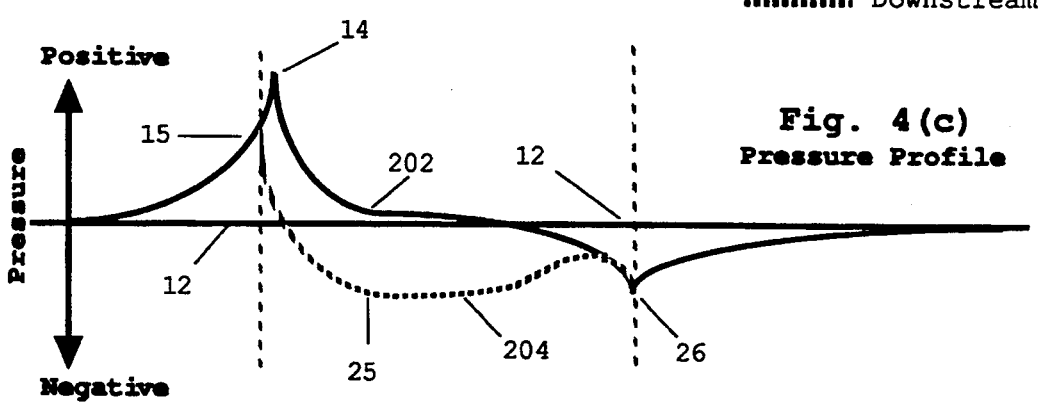

Corresponding to the velocity profile of FIG. 4(b), the pressure profile of FIG. 4(c) indicates a rapid rise from a free-stream static pressure (12) towards a maximum stagnation pressure (14) at the point (17) and an intermediate off-axis nose pressure (15) is reached at the leading edge (4). The pressure then drops gradually on the upstream side (42) of the bluff body (20), as shown by the curve (202), to a minimum value, i.e., base pressure (26), near the trailing edge (22). The pressure thereafter gradually rises to the value of the free-stream static pressure (12), and again reaches equilibrium. On the upstream side (42), the difference between the off-axis nose pressure (15) and the base pressure (26) reveals that pressure recovery is incomplete and that a retarding force, i.e., base pressure drag, is created.

On the downstream side (44) of the bluff body (20), the velocity profile of FIG. 4(b) shows that a fluid particle first decelerates from free-stream velocity (10) towards zero until it attains the intermediate off-axis nose velocity (11) at the leading edge (4). The fluid particle then accelerates rapidly, as shown by the curve (203), from the leading edge (4) to a maximum velocity (23), and then decelerates slightly to the base velocity (24) at the trailing edge (22). The fluid particle then gradually decelerates to the free-stream velocity (10) whereby the fluid particle once again reaches equilibrium.

Corresponding to the velocity profile of FIG. 4 (b), the pressure profile of FIG. 4 (c) indicates that a fluid particle experiences a rapid pressure rise from the free-stream static pressure (12) towards the maximum stagnation pressure (14) until it reaches the intermediate off-axis nose pressure (15) at the leading edge (4). The pressure then decays rapidly on the downstream side (44) of the bluff body (20), as shown by the curve (204), to a minimum value (25) near the maximum width (21) of bluff body (20), rises slowly towards the free-stream static pressure (12), but then drops to the value of the base pressure (26). The fluid particle then gradually recovers to the value of the free-stream static pressure (12) whereby it achieves equilibrium. On the downstream side (44) of the bluff body (20), the difference between the nose pressure (15) at the leading edge (4) on the bluff body (20) and the base pressure (26) near the trailing edge (22) also indicates that pressure recovery is incomplete and that base-pressure drag is created. Flow in the broad wake of bluff body (20) is chaotic and is indicated as the turbulent wake (28).

Figure 5:
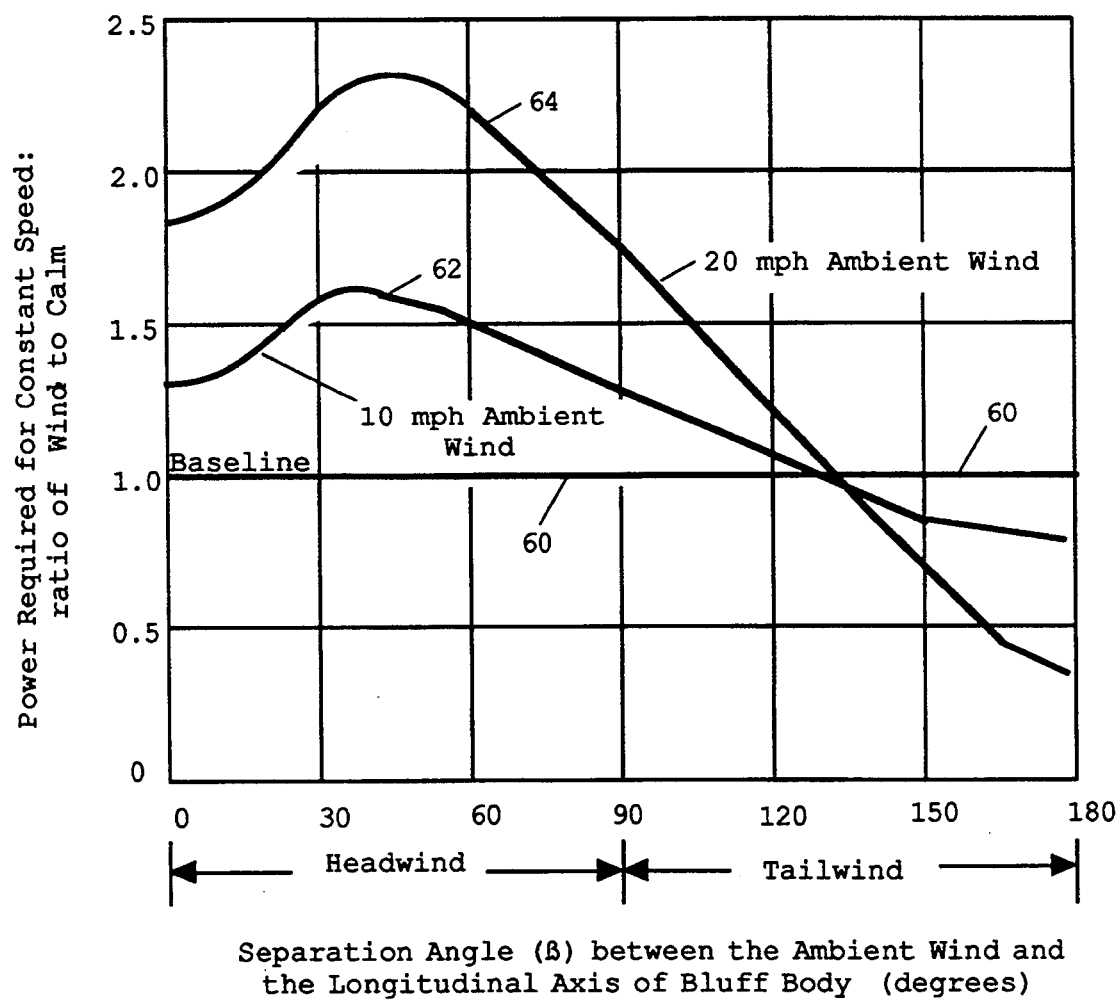
FIG. 5 is a graph of the effect of ambient wind on the power required to maintain a constant speed of a bluff body.
Figure 7:
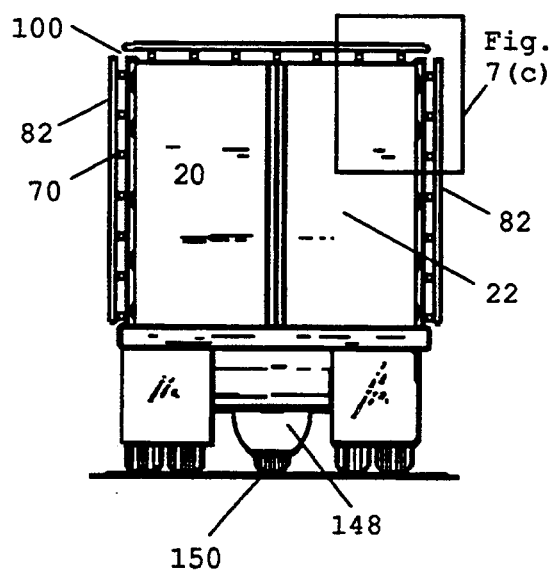
FIG. 7 (d) is a detail view of a portion of FIG. 7(b)
Figure 7:
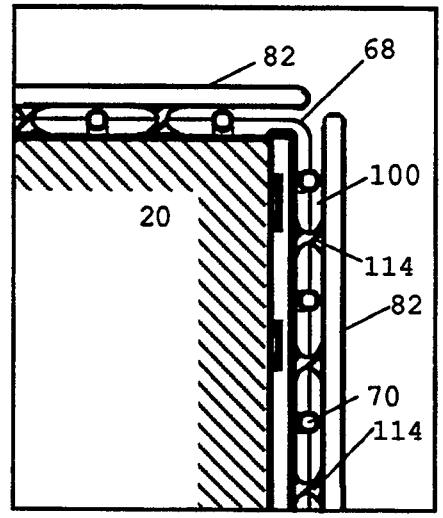
Figure 7:
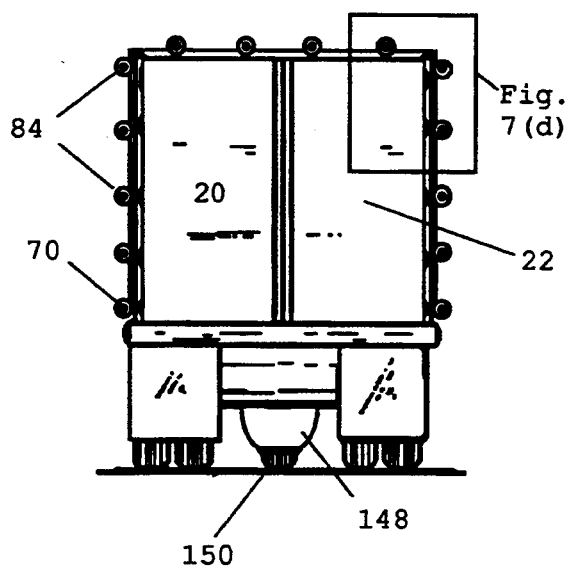
Figure 7:
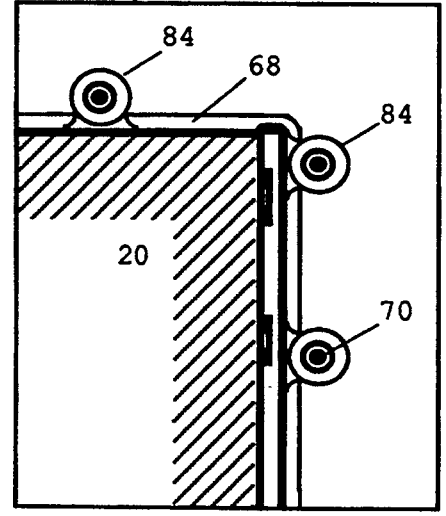
Figure 8:
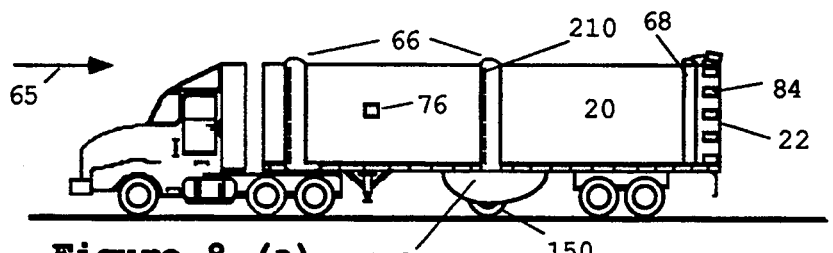
FIG. 8(a) is a side view of the apparatus and the bluff body of FIG. 6 (b)
FIG. 8(b) is an enlarged view of a portion of FIG. 8(a)
FIG. 8(c) is a side view of the apparatus and the bluff body of FIG. 6 (a)
FIG. 8(d) is a detail view of a portion of FIG. 8 (b)
FIG. 8(e) is a detail view of a portion of FIG. 8(c)
Figure 8:
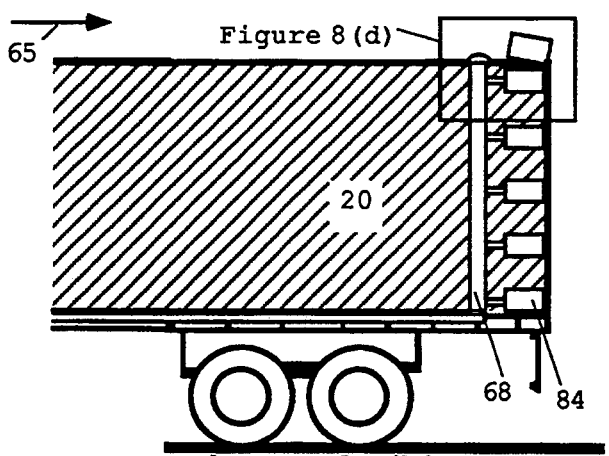
Figure 8:
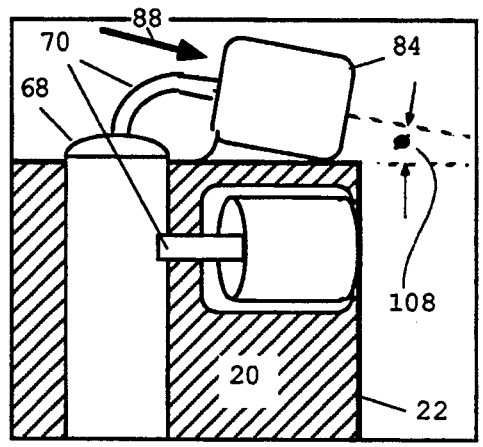
Figure 8:
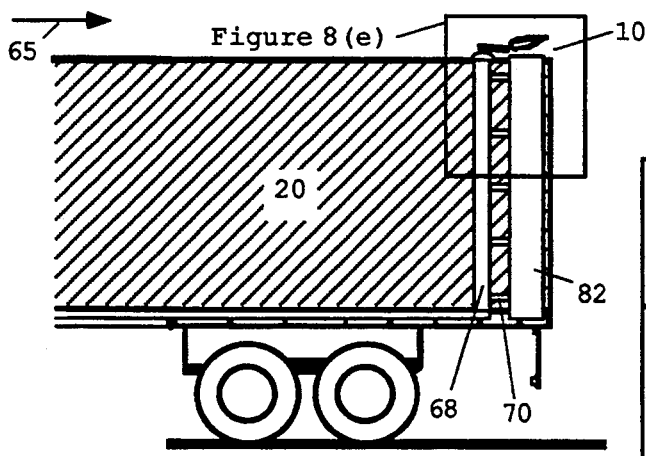
Figure 8:
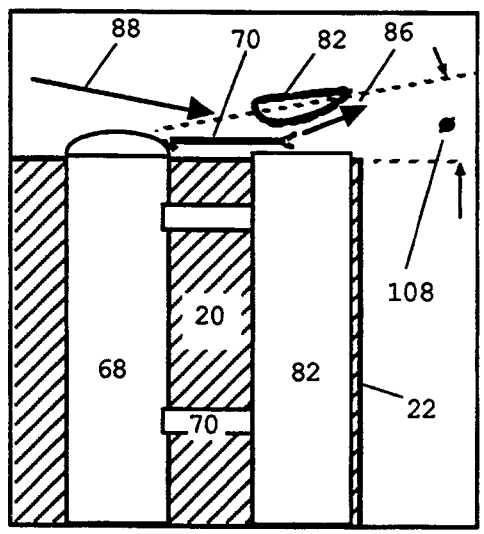

FIG. 5 shows the effect of ambient winds on the power required to overcome aerodynamic drag while maintaining a constant speed as a function of the separation angle β (33) between an ambient wind (32) and the longitudinal axis (36) of a bluff body (20). The power required to maintain constant speed for calm conditions is indicated as a baseline (60), and for ambient winds of 10 miles per hour as a curve (62). The curve (62) shows that the power requirement exceeds the baseline (60) by a factor of more than 1.5 when the ambient wind (32) intercepts the bluff body (20) at a separation angle β (33) between about 30 and 60 degrees. For ambient winds of 20 miles per hour, a curve (64) indicates that a power requirement of nearly 2.5 times greater than the baseline (60) is required for certain separation angles β (33). FIG. 5 clearly illustrates the need for drag reduction on bluff bodies. FIG. 5 is adapted from a report to the RANN Program, National Science Foundation, by Charles L. Brunow, "An Evaluation of Truck Aerodynamic Drag Reduction Devices and Tests," June, 1975, pp.106, which is hereby incorporated herein by reference.

FIGS. 6(a)-8(e) provide a general overview of the preferred embodiments of the invention installed on a bluff body (20), as represented by a conventional tractor-trailer truck having a bluff trailing edge (22). FIGS. 6(a)-8(e) illustrate a trailer fitted with air inlets (66) and air outlets (70), and show details of static flow controllers in FIGS. 6(a), 6(c), 7(a), 7(c), 8(c), and 8(e), and of dynamic flow controllers in FIGS. 6(b), 6(d), 7(b), 7(d), 8(a), 8(b), and 8(d). FIGS. 7(a)-(d) are rear views of the apparatuses and the bluff body (20) of FIGS. 6(a)-6(d), and FIGS. 8(a)-8(e) are side views of the apparatuses and the bluff body (20).

Figure 14:
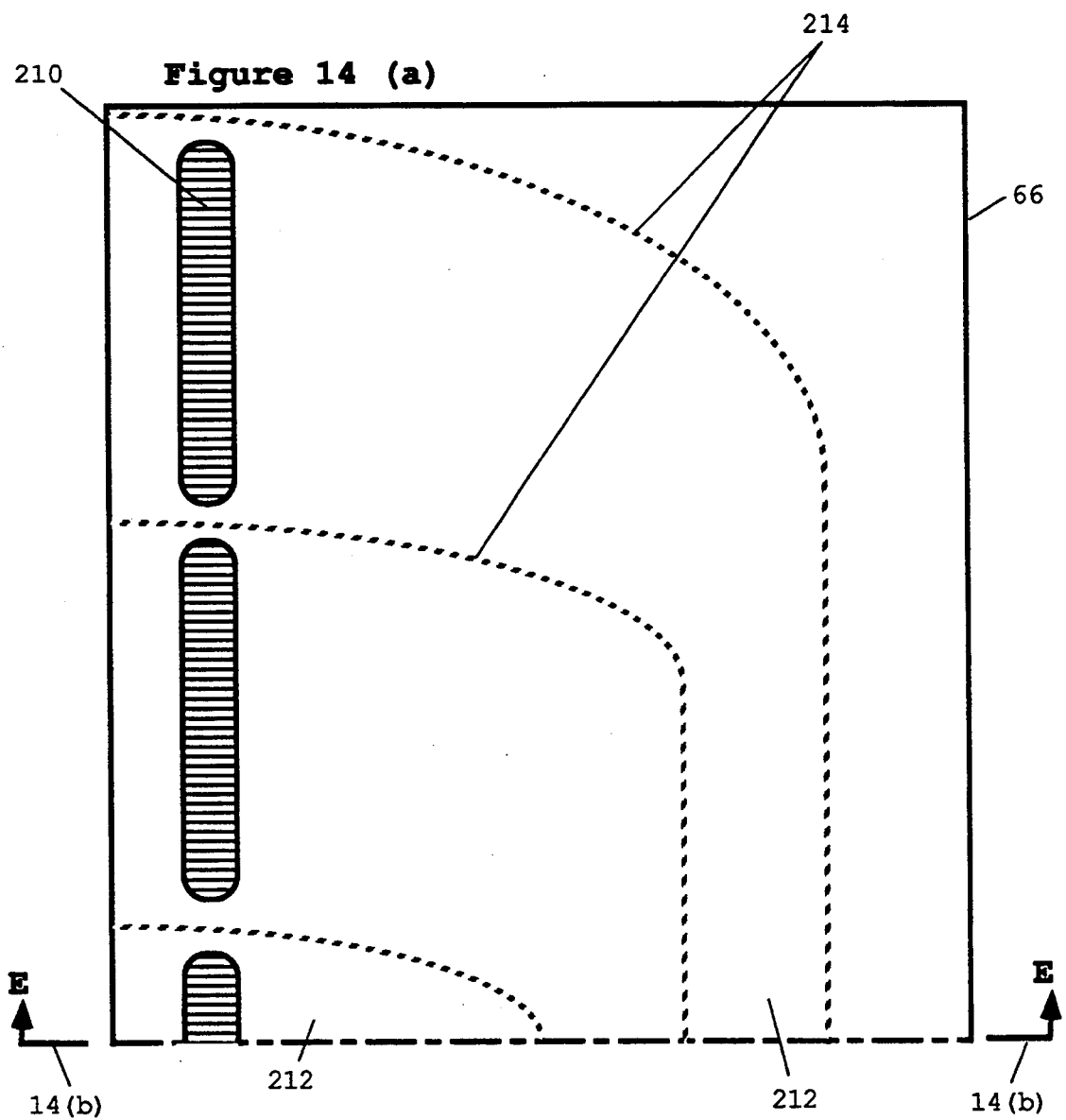
FIG. 14(a) is a side view of an air inlet of the apparatus of the present invention.
FIG. 14(b) is a cross-sectional view along line E—E of FIG. 14(a).
Figure 14:
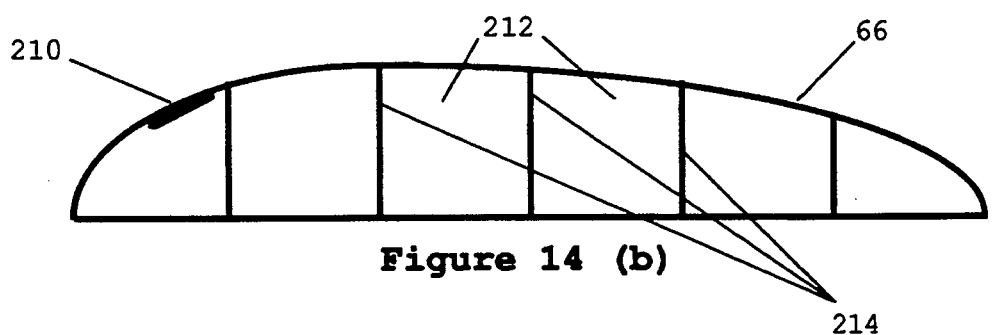

The outlets (70), the static flow controllers, and the dynamic flow controllers will be described hereinbelow in greater detail. The inlets (66), as can be seen in FIGS. 6(a), 6(b), and 8(a), may extend around the top and sides of forward portions of the bluff body (20), and allow air from a boundary flow around the bluff body (20) to be inlet. As seen in FIGS. 6(a)-6(b) and 14(a), the inlets (66) include slots (210) therein through which air is inlet. The slots (210) open into a plurality of chambers (212) which are divided by internal baffles (214). The internal baffles (214) are used to equalize a rate of intake flow along the length of an inlet (66), and any number of baffles (214) may be used to achieve this end. As shown in FIGS. 6(a) and (b), the chambers (212) extend parallel to each other along the length of an inlet (66), and preferably all extend to a lower end of the inlet (66) to connect with ducts (68) of a boundary layer control system which will be described hereinbelow. It should be noted that the relative lengths of the slots (210) may be varied to help equalize the rate of intake flow along the length of an inlet (66).

Figure 9:
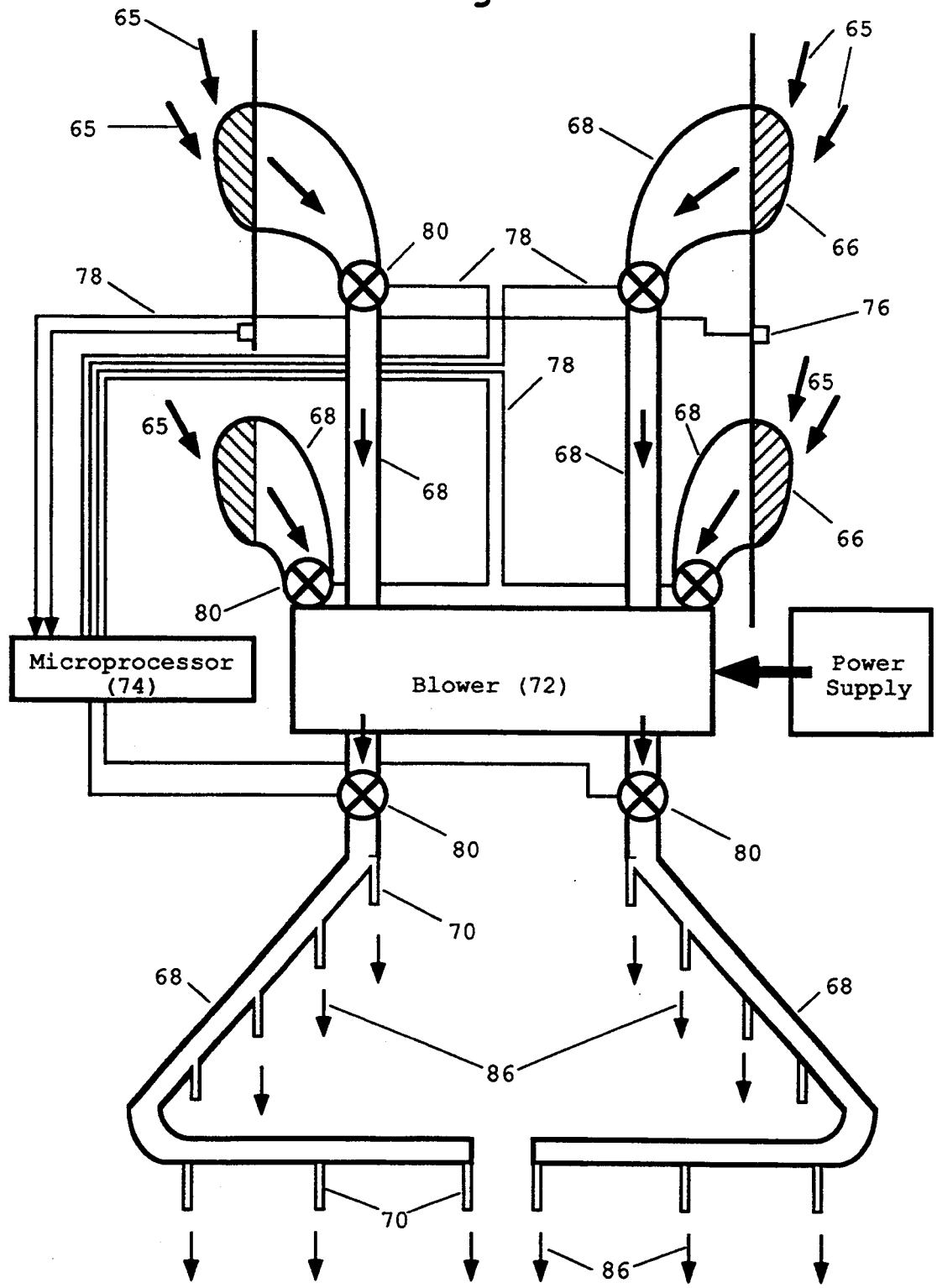
FIG. 9 is a schematic view of a boundary layer control system and a microprocessor control system.
Figure 10A:
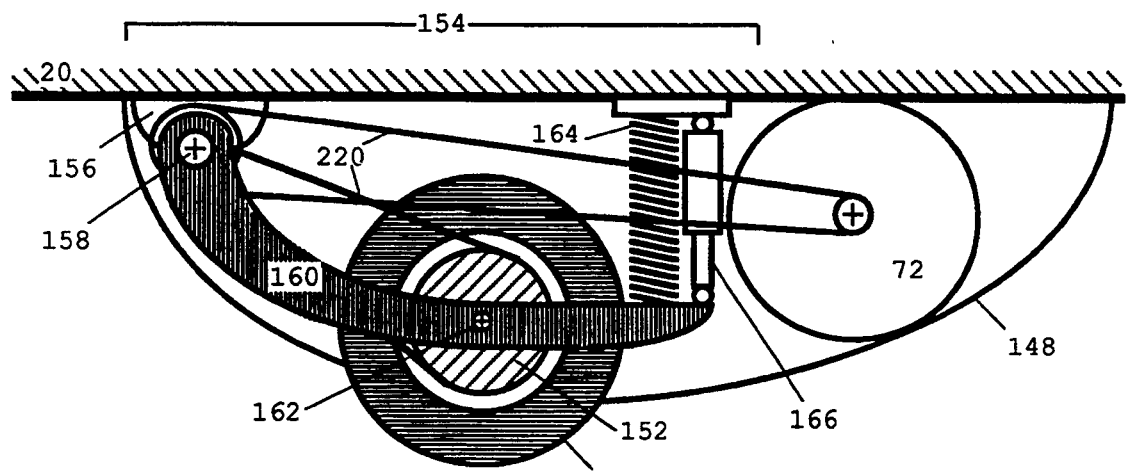
FIG. 10(a) is a side view of a mechanical power supply system of the present invention.
Figure 10B:
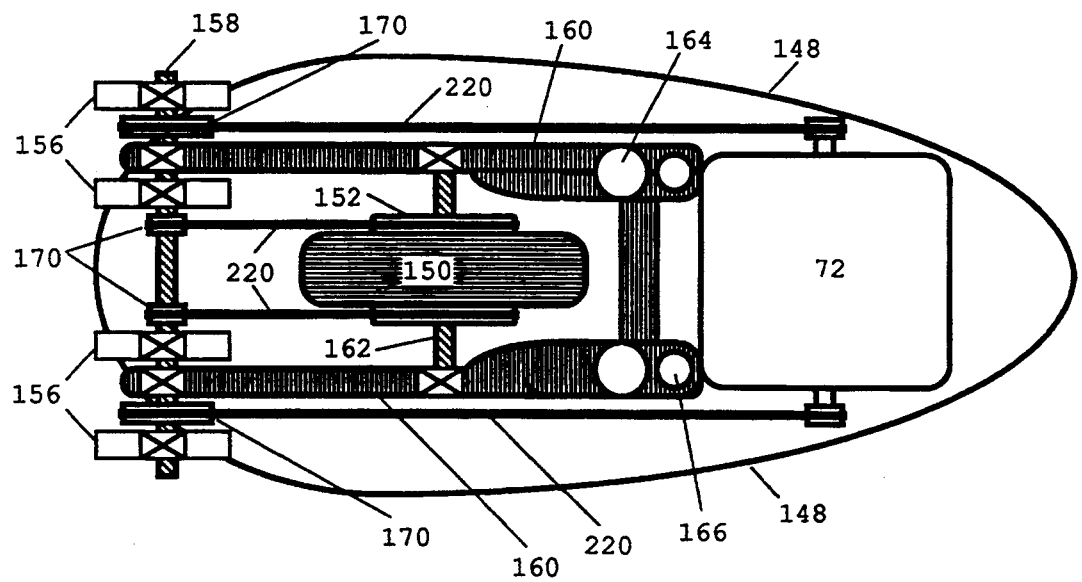
FIG. 10(b) is a top view of the system of FIG. 10(a)

A boundary layer control system is shown in FIG. 9, and includes air inlets (66) which control the growth of a boundary layer by capturing a portion of boundary layer flow (65), the air outlets (70), and ducts (68) which connect the air inlets (66) to the air outlets (70), which are located around the rear periphery of the bluff body (20) near the bluff trailing edge (22). A blower (72) is located in the ductwork (68) in communication with both the air inlets (66) and the air outlets (70), and it provides a variable pressure differential between the inlets and the outlets. The blower (72) responds to signals from a microprocessor (74) which controls the intensity and operation of the blower (72) as well as the operation of valves (80) in the ductwork (68). The air outlets (70) may be single or multiple and may be "vectored" via control signals from the microprocessor (74) so as to respond to different ambient conditions and relative winds (34) for the purpose of minimizing aerodynamic drag, as will be described further hereinbelow.

Figure 13:
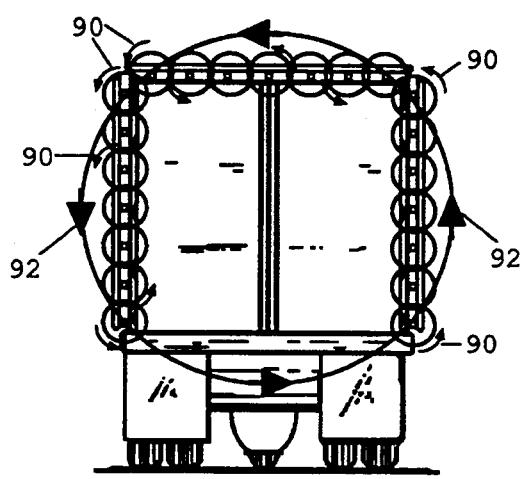
FIG. 13 (b) is a view similar to FIG. 7(b), showing the formation of a plurality of small vortices, and a large vortex.
Figure 13:
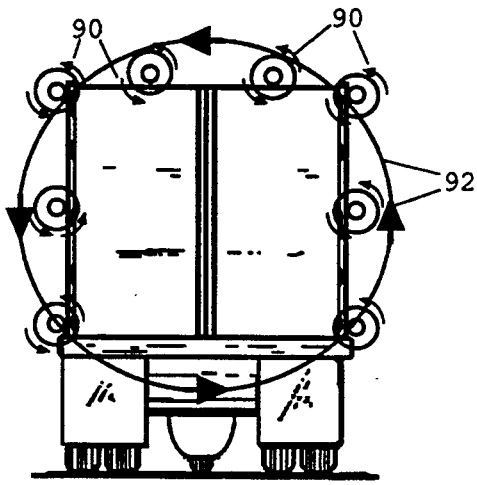
Figure 13:
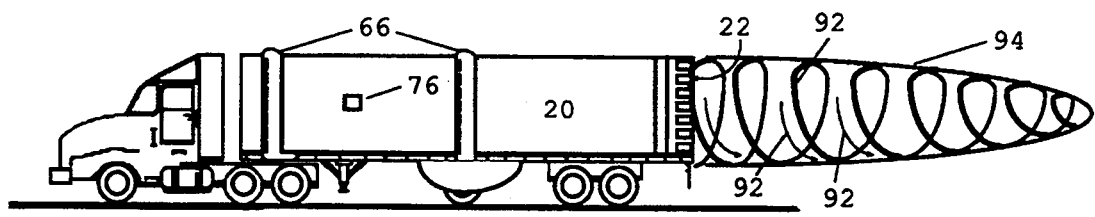
Figure 13:
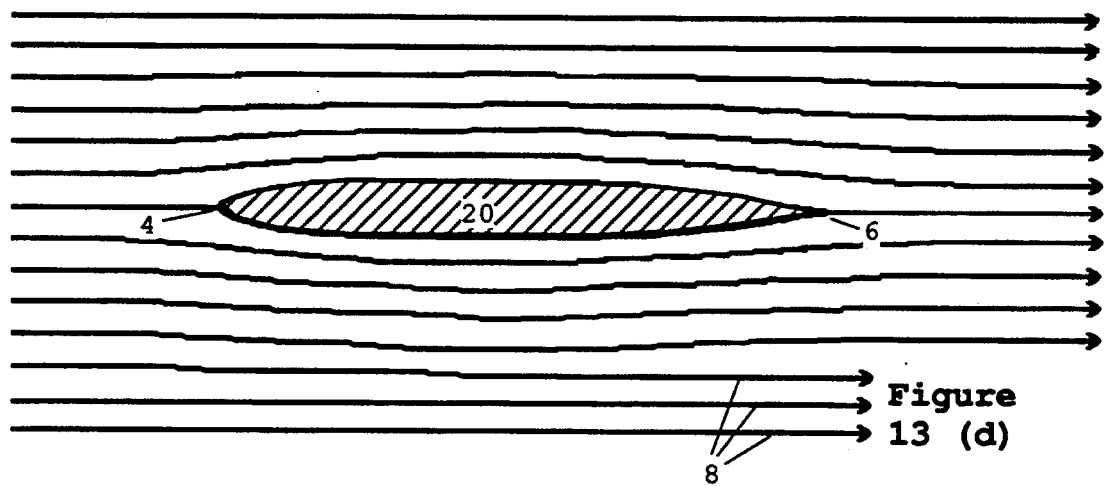

During operation, the air inlets (66) capture a variable portion of the boundary layer flow (65) from around forward portions of the bluff body (20), and, via the ductwork (68), the valves (80), and the blower (72), allow the inlet air to pass through air outlets (70) located in regions of relatively low base pressure (26) near the bluff trailing edge (22). As will be described in more detail hereinbelow, the additional mass of air released behind the bluff body (20) acts to increase the base pressure (26) and to generate an invisible streamlined afterbody (94), shown in FIG. 13(c), that is essentially a "pressure shell". As illustrated by FIG. 13(d), the streamlined afterbody (94) prevents chaotic flow in turbulent wake (28) and thereby decreases base pressure drag.

A microprocessor control system is also shown in FIG. 9, and includes the microprocessor (74), pressure transducers (76), control wiring (78), and the air valves (80). The microprocessor (74) controls and regulates the performance of the boundary layer control system over a full range of road conditions where an ambient wind (32) and an apparent wind (30) combine to yield a resulting relative wind (34) which acts at a yaw angle $\Delta$ (40) which is angularly displaced from the longitudinal axis (36) of the bluff body (20), such as shown in FIG. 4(a). The relative wind (34) is highly variable and the value of the yaw angle $\Delta$ (40) changes with each change in local wind direction and speed as well as with each change of vehicle direction and speed. Also, the relative wind (34) creates greater or lesser separation of the boundary layer, and proportionately greater or lesser aerodynamic drag, depending upon the value of the ambient wind (32) as illustrated by FIG. 5.

The pressure transducers (76) are located on the bluff body (20) as seen in FIGS. 6(a) and (b), and they sense the pressure and the yaw angle $\Delta$ (40), and send an output via the control wiring (78) to the microprocessor (74). The microprocessor (74) responds to the transducers output by controlling the valves (80) and thus controlling suction rates at the various air inlets (66) and blowing rates at the various air outlets (70). By operation of the microprocessor (74), the effectiveness of the boundary layer control system is optimized throughout a broad range of ambient conditions, including a highly variable relative wind (34). Air may be routed under the control of microprocessor (74) to air outlets (70) in greater or lesser volume, and differentially from the upstream side (42) to the downstream side (44) of the bluff body (20), in response to, for example, the different upstream and downstream flow conditions shown in FIG. 4(a).

As shown in FIG. 4(c), the pressure on the upstream side (42) of the bluff body (20) is greater than the pressure on the downstream side (44) of the bluff body (20). To help equalize the pressure between the upstream and the downstream sides, the microprocessor (74) can allow the inlet valves (80) on the upstream side (42) to open further than the inlet valves (80) on the downstream side (44), to thus remove a greater portion of the boundary layer flow on the upstream side (42), and to thus outlet a greater amount of air out of the outlets (70) on the downstream side (4), to help equalize the pressure on the upstream side (42). Also, the apparatus may be designed such that the amount of air which is allowed to pass through the outlets (70) varies depending on a relative height each outlet (70) is from the ground. Such a feature could be advantageous since it is common for ambient winds to increase in velocity with an increase in distance from the ground.

It should be noted that the present invention may be advantageously operated without use of the differential air flow described above. However, different suction and blowing rates on the upstream side (42) and the downstream side (44) enables the performance of the apparatus to be maximized throughout a wide range of ambient wind conditions and resultant winds.

As shown in FIGS. 7(a), 7(b), 8(a), and 10(a)-(b), power is provided to the boundary layer control system and the microprocessor control system by a mechanical power supply system. The mechanical power supply system includes an aerodynamic fairing (148), and a road wheel (150) having an integral primary drive sprocket (152). The road wheel (150) is mounted in a conventional trailing "A" frame suspension (154) and is mechanically coupled to the blower (72) by two pairs of toothed belts (220). The trailing "A" frame suspension (154) includes mounting plates (156) which attach the power supply system to the bluff body (20), pivots (158) which allow trailing arms (160) to follow the road contour, a stub axle (162) for the road wheel (150), suspension springs (164), and shock absorbers (166). The longitudinal axis of pivots (158) coincides with co-axial drive sprockets (170).

The mechanical power supply system requires no speed regulation because its primary mechanical energy is derived from the road surface in direct proportion to vehicle speed. As a consequence, the strength of the pressure shell (194) is zero at rest and reaches a maximum strength at maximum vehicle speed. This simplification offers the distinct advantage of speed regulation. Additionally, the disclosed mechanical power supply system offers a clear advantage of safety over power supply systems using small gasoline or diesel engines, because no additional fueling or fuel lines are required. The disclosed mechanical power supply system is also simpler than an electric power supply system because it imposes no special electrical generating or wiring requirements on a tractor, trailer or semi-trailer. The energy penalty of the power supply system is masked by the greater energy savings made possible by aerodynamic improvement. It should be noted that, although a mechanical system is described, either electrical, hydraulic, pneumatic or mechanical means, or their variants, singly or in combination, may be used for the power supply system without departing from the spirit of the invention.

A thrust augmentation system is shown in FIGS. 6(a)-8(e) and 11(a)-13(d). The thrust augmentation system includes either static flow controllers (82) or dynamic flow controllers (84) attached to the periphery of the bluff body (20) at the rear end or trailing edge thereof. The controllers (82,84) are designed to utilize air passing through air outlets (70) to greatly augment and organize the flow behind the bluff body trailing edge (22), and to modify and reenergize the base pressure (26). A variable portion of the boundary layer flow (65) is captured by the boundary layer control system as directed by the microprocessor (74). The variable portion so captured is re-injected as a primary flow (86) into an otherwise turbulent wake (28). The primary flow (86) is supplemented by the entrainment of considerable additional mass from the remaining boundary layer to serve as a secondary flow (88), and will be explained hereinbelow. The re-injection provides intense organization of the injected primary flow (86) and entrained secondary flow (88) by action of the thrust augmentation system.

FIGS. 11(f) and (g) illustrate one embodiment of a static flow controller (82) in the form of a flow directing device (100) of high aspect-ratio and of a length equal to the height or width of the bluff body (20). The flow directing device includes a pair of flow directors or flow diverters in the form of thin airfoils (104). A plurality of the outlets (70) are arranged between the flow directors to direct the primary flow (86) between the flow directors. Flow conditioners (114) may be utilized in the slotted area to further condition the primary flow ejected through air outlets (70) into the turbulent wake (28), as shown in FIGS. 7(c) and 11(g).

The flow directors may include two thin aerodynamic "flat plates" (102) as shown in FIG. 11(c), two thin airfoils (104) as shown in FIG. 11(f), or combinations of flat plates (102) and airfoils (104) as shown in FIGS. 11(d)-(e). The longitudinal sides of the flow directors may have their chord-wise axes (106) parallel as shown in the upper portion of FIG. 11(a) and in FIGS. 11(c)-(f), or intersecting at a convergence angle $\phi$ (108) as shown in the lower portion of FIG. 11(a), in FIG. 11(b), and in FIGS. 11(h)-(o). Also, the longitudinal sides of the flow directors may have their longitudinal axes (110) on a common perpendicular from the side of the bluff body (20) as shown in FIGS. 11(a)-(o), or offset from the bluff body (20) or each other by an offset distance $\alpha$ (112) as shown in FIGS. 11(p)-(s). The exposed surfaces of the flow directors may be smooth, ribbed or rough. Operation of the stationary flow controller (82) will be described further hereinbelow.

FIGS. 12(a)-(d) provide a detailed sectional view of a dynamic flow controller (84), which includes a circular venturi (118) concentric with a high pressure primary nozzle (120), which is connected to an outlet (70). The nozzle (120) exhibits a compound coning angle $\mu$ (122) and a sweepback angle $\Omega$ (124). The term "high pressure" is relative to the dynamic stagnation pressure (14) of the boundary layer, which may be measured as a fraction of an inch of water column, at typical highway speeds. The action of a dynamic flow controller (84) may be best understood by following the movement of air through the apparatus. Air from the boundary layer flow is drawn into the air inlets (66), through the ductwork (68) and the blower (72), and is ejected through the air outlets (70) as a primary flow (86) into the high pressure primary nozzles (120) centrally located in the circular venturi (118). The primary flow (86) may be distributed within the primary nozzle (120) through any number of internal passageways (preferably 3 or 4) which terminate in final outlet nozzles (121).

The nozzles (120) may be either fixed or rotatable. Rotatable high pressure nozzles (120) may be mounted on bearings (130) fixed to air outlets (70). The bearings (130) may include ball bearings, etc., or they may be free-wheeling. The inner periphery of the circular venturi (118) preferably has a cross-section which is an airfoil of "Clark Y" profile, which profile was widely used on the wings of early aircraft.

As the primary flow (86) is introduced into circular venturi (118) by the outlet nozzles (121), part of its flow energy is transferred to an induced low-energy secondary flow (88) entrained from the remaining boundary layer at the inner periphery (132) of the circular venturi (118). A net energy and momentum exchange between the high pressure primary flow (86) and the low pressure induced secondary flow (88) is completed before the combined flows (126) are released through the exit plane (128) of the circular venturi (118). FIG. 12(c) provides an upstream view into the dynamic flow controller (84) at exit plane (128).

Located just upstream of and partially surrounding the nozzle (120) is a backflow redirector (134), which acts to convert counterproductive leakage of the primary flow (86) into beneficial flow. For the thrust augmenter to work properly, the primary flow must be ejected from the nozzle (120) at a pressure several times greater than the pressure of the secondary flow (88). At highway speeds, the dynamic pressure of the boundary layer of a bluff body does not exceed an inch of water column. consequently, the primary flow (86) is only pressurized up to about 8 inches of water column (about 0.28 psi). With such a low pressure for the primary flow (86), the bearing (130) must have exceedingly low resistance to turning, or the sweepback angle (124) of the outlet nozzle (121) will not provide enough reactive force to turn the nozzle (120). The internal surface of the nozzle (120) is therefore relieved such that it does not touch the end of the outlet (70) Unfortunately however, this relief allows a portion of primary flow (86) to escape upstream, which inhibits the entrainment of the secondary flow (88). Thus, the backflow redirector (134), by means of a curved inner surface (135) thereof, redirects the leakage back downstream through the circular venturi (118), along an outer surface of the nozzle 120. This redirection not only solves the problem of counterproductive leakage, but also enhances the operation of the nozzle (120), since the nozzle (120) is bathed in a thin veil of higher-pressure primary, redirected flow, which reduces drag on the nozzle (120).

The longitudinal axis (116) of the circular venturi (118) intersects the plane of the longitudinal axis (36) of bluff body (20) at a convergence angle $\phi$ (108) of approximately 10 to 15 degrees. Convergence angle $\phi$ (108) is chosen to approximate the convergence of a conventional streamlined body (2) from its widest point to its trailing edge (6). Specifically, the convergence angle (108) is chosen to be an angle whose tangent equals one-half the maximum width of the bluff body (20), divided by the distance along a longitudinal axis of a streamlined body from its maximum width to its trailing edge. The convergence angle (108) is thus selected to define a "pressure shell" which approximates as closely as possible a streamlined body. This approximation reduces the chance of early separation of the boundary layer and thus reduces drag.

FIG. 12(b) is taken along section line B—B of FIG. 12(a) through the longitudinal axis (116), and illustrates compound coning angle $\mu$ (122). FIG. 12(d) is taken along section line D—D of FIG. 12(b) through the longitudinal axis of final outlet nozzle (121) to illustrate sweepback angle $\Omega$ (124). Compound coning angle $\mu$ (122) and sweepback angle $\Omega$ (124) are chosen to maximize the performance of the dynamic flow controller (84).

At the exit plane (128) of a controller such as the dynamic flow controller (84) shown in FIG. 12(a), the primary flow (86) and the secondary flow (88) are mixed with a mutual energy exchange, and are exhausted as combined flow (126). The amount of energy exchanged is such that the velocities of the two flows are about equal when passing through the exit plane (128). For equal velocities to exist at exit plane (128), it is believed that the sum of the kinetic inflow energies must equal the sum of the kinetic outflow energies, as predicted by J. V. Foa in his text *Elements of Flight Propulsion*, John Wiley & Sons, 1960, pp. 234, which is hereby incorporated herein by reference. In other words, air outlet (70) is used innovatively to provide primary air flow to a thrust augmenter as a "trigger" to induce the movement of a much greater volume of air as entrained secondary flow (88).

Combined flow (126), whether produced by dynamic flow controllers (84) or static flow controllers (82), exhibits organization and intense vorticity as it progresses past bluff trailing edge (22), creating a downstream-extending small high-energy vortex (90). A plurality of static flow controllers (82) or dynamic flow controllers (84) are positioned around the periphery of the bluff body trailing edge (22) such that a series of mutually-supporting small vortices (90) of the same sign of rotation are formed, and then roll up into a sheet vortex (92). The creation of the sheet vortex (92) redefines base pressure distribution because it is apparent to the remaining boundary layer as an invisible streamlined after-body (94) or "boat-tail".

FIGS. 13(a)–(d) show the organization of flow and the creation of a "pressure shell" as an invisible streamlined afterbody (94) at the rear of the bluff body (20). The pressure shell (94) is created from the plurality of small individual high-energy vortices (90) of the same sign of rotation which are automatically created by the controllers (82,84). The small vortices (90) combine to form a sheet vortex (92) to replace the turbulent wake (28) of bluff body (20). Streamlines (8) of FIG. 13(d) indicate the flow of the remaining boundary layer around a bluff body which has an invisible streamlined afterbody (94). As in FIG. 1(a), the streamlines of FIG. 13(d) indicate a more complete pressure recovery at the trailing edge (6) as the base pressure (24) is increased, preferably to more nearly match (be generally near) the dynamic stagnation pressure (14) at the leading edge (4) of the bluff body (20).

The benefits of the thrust augmentation system working in conjunction with the boundary layer control system are three-fold. First, boundary layer control reduces the broad eddying wake that would otherwise form downstream of the widest point (21) of bluff body (20) and this reduces aerodynamic drag. Second, considerable additional mass derived from the remaining boundary layer is entrained as secondary flow (88) and released behind the bluff body (20) to provide actual, but modest thrust augmentation. Thirdly, a disproportionately large aerodynamic benefit is achieved by the combination of a plurality of mutually supporting vortices to form a single large vortex with structure and organization derived from combined flows (126) so as to replace an otherwise chaotic and turbulent wake (28) with an invisible streamlined after-body (94) as described above. All three benefits combine to increase base pressure, reduce aerodynamic drag and increase fuel efficiency.

Since the invisible after-body (94) is a "pressure shell" derived from controlling and organizing the flow of the original boundary layer, there is no physical structure to significantly alter dimensions of the bluff body (20), to inhibit loading and unloading operations, to reduce cargo capacity, to require substantially greater parking space or to alter current shipping practice.

Also, static flow controllers (82) or dynamic flow controllers (84) may be readily and permanently mounted to the rear of a trailer equipped with "roll-up" overhead doors. For trailers fitted with conventional hinged rear doors, retrofit offset hinges may readily be installed to allow permanent attachment of fixed flow controllers (82) or (84). Alternatively, flow controllers (82) or (84) may be mounted at the rear of the bluff body (20) such that they can be swung or moved forwardly, toward the front of the bluff body (20) so as to allow full utilization of hinged rear doors, without departing from the spirit of the invention.

It is to be noted that, while extended reference has been made hereinabove to the use of the method and apparatus of the present invention with a bluff body such as a tractor-trailer, the method and apparatus may equally well be used with other bluff bodies such as vans, campers, etc., or with semi-streamlined vehicles such as automobiles.

What is claimed is:

1. A method of reducing drag produced by relative air movement on a moving, non-lifting bluff body, said body having a front end and a rear end, wherein said body has a substantially closed surface at its rear end, wherein said body is an entire moving system, comprising of steps of:

modifying a rear air pressure behind a rear of said body such that said rear air pressure is increased, said air pressure modifying step including inletting an amount of air from a boundary flow around said body, and forming a pressure shell behind said rear of said body, said pressure shell forming step including forming a large vortex behind said rear of said body by outletting said inlet air at said rear of said body in a plurality of small high-energy vortices of one sense of rotation, which combine to titan a large vortex of one sense of rotation behind said entire moving system.

2. A method as claimed in claim 1, wherein said air pressure modifying step further includes sucking air from inlets into ducts, and blowing said inlet air from said ducts toward outlets.

3. A method as claimed in claim 1, wherein said air pressure modifying step further includes sensing a pressure and yaw angle of said relative air movement, and controlling a rate at which said air is inlet and a rate at which said inlet air is outlet based on said sensed pressure and yaw angle of said relative air movement.

4. A method as claimed in claim 3, wherein said outletting step includes outletting said inlet air around a periphery of said rear of said body, and wherein said controlling step includes controlling an amount of said inlet air which is outlet at different locations on said periphery.

5. A method as claimed in claim 3, wherein said sensing step includes sensing air pressures produced by said relative air movement on sides of said body.

6. A method as claimed in claim 1, wherein said outletting step includes outletting said inlet air at a plurality of locations which are spaced around a periphery of said rear of said body such that said plurality of small high-energy vortices form a single large vortex.

7. A method as claimed in claim 1, wherein said inletting step includes inletting a portion of said boundary flow around forward portions of said body.

8. A method as claimed in claim 1, wherein said outletting step includes entraining a portion of said boundary flow with said inlet air as said inlet air is outlet.

9. A method as claimed in claim 1, wherein said outletting step includes holding an outlet stationary relative to said body, and passing said inlet air through said outlet.

10. A method as claimed in claim 1, wherein said outletting step includes passing said inlet air through an outlet which is rotating relative to said body.

11. A method as claimed in claim 1, wherein said outletting step includes outletting said inlet air at a number of locations spaced around a periphery of said rear of said body, in directions angled toward a center of said rear.

12. An apparatus for reducing drag on a moving body, comprising:
a controller;
at least one sensor for sensing a pressure and yaw angle of a relative air movement, an output of said sensor being connected to said controller;
at least one air inlet for inletting air;
a plurality of thrust augmenters connected to said air inlet; and
at least one valve connected between said air inlet and said plurality of thrust augmenters, said controller being connected to said valve to control a rate of air flow through said valve in response to said output of said sensor.

13. An apparatus as claimed in claim 12, further including:
a blower connected between said air inlet and said plurality of thrust augmenters to suck air into said air inlet and to force inlet air out of said plurality of thrust augmenters.

14. An apparatus as claimed in claim 12, wherein said apparatus includes a plurality of air inlets and a plurality of valves connected to said controller, a valve being connected between each of said air inlets and said plurality of thrust augmenters such that said controller controls a rate of air flow from each of said air inlets based on said output of said sensor.

15. An apparatus as claimed in claim 12, wherein said apparatus includes a pair of sensors for sensing a pressure and yaw angle of a relative air movement at spaced locations.

16. An apparatus as claimed in claim 12, wherein said apparatus includes at least two valves connected to said controller, each of said valves being connected between said air inlet and a set of said thrust augmenters such that said controller controls a rate of air flow through each set of thrust augmenters separately, based on said output of said sensor.

17. An apparatus as claimed in claim 12, wherein said apparatus includes valves connected to said controller, and connected between said air inlet and said thrust augmenters, a rate of air flow through each of said thrust augmenters being controllable by said controller through said valves based on a relative height of each said thrust augmenter.

18. An apparatus as claimed in claim 12, wherein each of said thrust augmenters includes a flow directing device having a pair of flow directors, and an air outlet which is connected to said air inlet and which is held stationary between said flow directors, said flow directors entraining a portion of a boundary layer air flow with air flowing from said air outlet.

19. An apparatus as claimed in claim 18, wherein at least one of each of said pair of flow directors is a flat plate.

20. An apparatus as claimed in claim 18, wherein at least one of each of said pair of flow directors is an airfoil.

21. An apparatus as claimed in claim 12, wherein each of said thrust augmenters includes a circular venturi, an air outlet which is connected to said air inlet and which is mounted rotatably within said venturi, and a backflow redirector mounted at a rear end of said air outlet.

22. An apparatus as claimed in claim 21, wherein each of said backflow redirectors is held stationary relative to a respective venturi, and is mounted around an upstream end of a respective air outlet to direct backflow of air from the air outlet downstream through the venturi.

23. An apparatus for reducing drag on a moving non-lifting bluff body, said body having a front end and a rear end, wherein said body has a substantially closed surface at its rear end, wherein said body is an entire moving system, comprising:
means for inletting an amount of air from a boundary layer flow; and
means for forming a pressure shell, said pressure shell forming means including means for forming a plurality of small high-energy vortices of the same sense of rotation, which combine to form a large vortex of one sense of rotation behind said entire moving system, said small vortex forming means including
means for outletting said inlet air, and
means for entraining a portion of the boundary lawyer flow with said inlet air.

24. An apparatus as claimed in claim 23, further including:
sensing means for sensing a pressure and a yaw angle of a relative air movement; and
controlling means for receiving said output of said sensing means and for controlling a rate of air flow through said outletting means based on said output.

25. An apparatus as claimed in claim 24, further including:
valve means connected in a flow path between said inletting means and said outletting means, said controlling means controlling said valve means to thereby control the rate of air flow through said outputting means.

26. An apparatus as claimed in claim 24, wherein said outletting means includes a plurality of spaced outlets, and wherein said controlling means controls a rate of air flow through said outlets based on a relative lateral and vertical position thereof.

27. An apparatus as claimed in claim 23, further including:
blowing means for sucking air into said inletting means and for forcing inlet air out of said outletting means.

28. An apparatus as claimed in claim 23, further including:
backflow redirecting means located at an upstream end of said outletting means for redirecting backflow from said outletting means downstream through said entraining means.

29. An apparatus as claimed in claim 23, wherein said entraining means includes a flow directing device having a pair of spaced flow directors, and said outletting means includes an outlet held stationary between said flow directors, at least one of said flow directors being an elongated flat plate.

30. An apparatus as claimed in claim 23, wherein said entraining means includes a flow directing device having a pair of spaced flow directors and said outletting means includes an outlet held stationary between said flow directors, at least one of said flow directors being an airfoil.

31. An apparatus as claimed in claim 23, wherein said entraining means includes a circular venturi and said outletting means includes an outlet mounted rotatably within said venturi.

32. An apparatus as claimed in claim 23, wherein said entraining means includes a circular venturi and said outletting means includes an outlet held stationary within said venturi.

33. An apparatus as claimed in claim 31, wherein an inner periphery of said circular venturi has a cross-section which is an airfoil of "Clark Y" profile.

34. An apparatus for reducing drag on a moving body, comprising:
at least one inlet mounted on a forward portion of said body;
a plurality of thrust augmenters mounted on a rear portion of said body;
at least one duct mounted on said body and connecting said inlet with said thrust augmenters,
at least one valve in said duct;
a pair of sensors mounted on said body to sense a pressure and a yaw angle of a relative air movement on said body; and
a controller connected to said sensors and said valve to control said valve and thus an air flow rate through said thrust augmenters, based on outputs of said sensors.

35. An apparatus as claimed in claim 34, further including:
a blower located in said duct, said blower being connected to a rotatable wheel mounted below said body.

36. An apparatus as claimed in claim 34, wherein each of said thrust augmenters include a flow diverting device having a pair of spaced flow diverters fixed to said body, and an outlet fixed to said body between said flow diverters.

37. An apparatus as claimed in claim 36, wherein at least one of each of said pairs of flow diverters is a flat plate.

38. An apparatus as claimed in claim 36, wherein at least one of each of said pairs of flow diverters is an airfoil.

39. An apparatus as claimed in claim 34, wherein each of said thrust augmenters includes a circular venturi fixed to said body, and an outlet rotatably mounted to said body within said venturi.

40. An apparatus as claimed in claim 39, wherein each of said thrust augmenters further includes a backflow redirector mounted around an upstream portion of said outlet to redirect backflow of air from said outlet downstream through said venturi.

41. An apparatus as claimed in claim 34, wherein each of said thrust augmenters includes a circular venturi fixed to said body, and an outlet held stationary within said venturi.

42. An apparatus as claimed in claim 34, wherein said apparatus includes at least a pair of inlets mounted on opposite sides of forward portions of said body, and wherein said thrust augmenters are mounted around a periphery of a rear of said body.

43. An apparatus as claimed in claim 34, wherein said thrust augmenters are angled toward a center of a rear of said body.

44. An apparatus as claimed in claim 34, wherein said body is a truck.

45. An apparatus as claimed in claim 34, wherein said body is an automobile.

46. An apparatus as claimed in claim 34, wherein said body is a van.

47. A thrust augmenter, comprising:
a circular venturi;
a nozzle mounted rotatably within said venturi; and
a backflow redirector mounted around an upstream end of said nozzle, said backflow redirector including means for redirecting upstream-directed leakage from said nozzle downstream around an outer surface of said nozzle.

48. A thrust augmenter as claimed in claim 47, wherein an inner periphery of said venturi has a cross-section which is an airfoil of "Clark Y" profile.

* * * * *